(12) United States Patent
Noda et al.

(10) Patent No.: US 8,926,183 B2
(45) Date of Patent: Jan. 6, 2015

(54) FLUID DYNAMIC BEARING DEVICE

(75) Inventors: Hiroyuki Noda, Kuwana (JP); Natsuhiko Mori, Kuwana (JP); Tetsuya Kurimura, Kuwana (JP); Isao Komori, Ama-gun (JP); Masaharu Hori, Kuwana (JP); Kimihiko Bito, Kuwana (JP); Toshiyuki Mizutani, Kuwana (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 14/002,037

(22) PCT Filed: Feb. 28, 2012

(86) PCT No.: PCT/JP2012/054863
§ 371 (c)(1),
(2), (4) Date: Aug. 28, 2013

(87) PCT Pub. No.: WO2012/121053
PCT Pub. Date: Sep. 13, 2012

(65) Prior Publication Data
US 2013/0336604 A1    Dec. 19, 2013

(30) Foreign Application Priority Data

Mar. 9, 2011  (JP) ................. 2011-050946
Mar. 9, 2011  (JP) ................. 2011-050949
Mar. 9, 2011  (JP) ................. 2011-050950
Jan. 24, 2012 (JP) ................. 2012-012019

(51) Int. Cl.
*F16C 32/06*  (2006.01)
*F16C 17/02*  (2006.01)
(Continued)

(52) U.S. Cl.
CPC ........... *F16C 32/0633* (2013.01); *F16C 17/026* (2013.01); *F16C 2220/20* (2013.01);
(Continued)

(58) Field of Classification Search
CPC .... F16C 17/026; F16C 17/107; F16C 33/107; F16C 32/0962; F16C 32/0633; F16C 2220/20; F16C 2220/40; F16C 2220/44; F16C 2220/70; G11B 19/2036
USPC ................. 384/100, 107, 112–115, 119, 121; 310/67 R, 90
See application file for complete search history.

(56) References Cited

U.S. PATENT DOCUMENTS 4,094,559 A * 6/1978 Slusarski ...................... 384/498
6,000,133 A * 12/1999 Takeuchi ................... 29/898.03
(Continued)

FOREIGN PATENT DOCUMENTS

JP    07-114766 A    5/1995
JP    07-296502 A    11/1995
(Continued)

OTHER PUBLICATIONS

International Preliminary Report on Patentability (Form PCT/IB/373) of International Application No. PCT/JP2012/054863 dated Sep. 10, 2013, with Form PCT/ISA/237.
(Continued)

*Primary Examiner* — Marcus Charles
(74) *Attorney, Agent, or Firm* — Westerman, Hattori, Daniels & Adrian, LLP

(57) ABSTRACT

An inner peripheral surface and a lower end surface of a bearing sleeve made of a sintered metal are each formed into a smooth cylindrical surface or a flat surface that does not have a dynamic pressure generating portion. Thus, a step of forming the dynamic pressure generating portion can be omitted from a manufacturing step of the bearing sleeve, and cost of dies can be markedly reduced. Further, the inner peripheral surface of the bearing sleeve is formed into the smooth cylindrical surface, and hence a radial dynamic pressure generating portion is formed on an outer peripheral surface of a shaft member. However, the outer peripheral surface of the shaft portion is accessible to tools, and hence the radial dynamic pressure generating portion can be formed easily with high accuracy. As a result, accuracy of a radial bearing gap is enhanced so that a bearing rigidity is enhanced.

12 Claims, 20 Drawing Sheets

(51) Int. Cl.
*F16C 43/02* (2006.01)
*F16C 17/10* (2006.01)
*F16C 33/10* (2006.01)
*F16C 33/14* (2006.01)
*G11B 19/20* (2006.01)

(52) U.S. Cl.
CPC ........ *F16C 2370/12* (2013.01); *F16C 2226/52* (2013.01); *F16C 2220/44* (2013.01); *F16C 43/02* (2013.01); *F16C 17/107* (2013.01); *F16C 33/107* (2013.01); *F16C 33/14* (2013.01); *G11B 19/2036* (2013.01); *F16C 2240/40* (2013.01); *F16C 2220/40* (2013.01)
USPC ........... 384/107; 384/100; 384/112; 384/114; 384/123

(56) References Cited

U.S. PATENT DOCUMENTS

| | | | | |
|---|---|---|---|---|
| 6,554,476 | B2* | 4/2003 | Ishikawa et al. | 384/123 |
| 6,717,310 | B2* | 4/2004 | Yoshikawa et al. | 384/107 |
| 7,530,741 | B2* | 5/2009 | Yamamoto | 384/100 |
| 7,591,591 | B2* | 9/2009 | Ito et al. | 384/107 |
| 7,625,124 | B2* | 12/2009 | Satoji et al. | 384/107 |
| 7,674,043 | B2* | 3/2010 | Asada et al. | 384/107 |
| 7,699,528 | B2* | 4/2010 | Hori et al. | 384/124 |
| 7,985,025 | B2* | 7/2011 | Satoji et al. | 384/107 |
| 8,079,760 | B2* | 12/2011 | Satoji et al. | 384/130 |
| 8,092,090 | B2* | 1/2012 | Yamamoto et al. | 384/100 |
| 2002/0064324 | A1 | 5/2002 | Yamada | |
| 2003/0016891 | A1* | 1/2003 | Gomyo et al. | 384/121 |
| 2005/0084189 | A1* | 4/2005 | Oelsch | 384/107 |
| 2005/0147334 | A1 | 7/2005 | Kanazawa et al. | |
| 2007/0104400 | A1* | 5/2007 | Ito et al. | 384/107 |
| 2007/0177831 | A1* | 8/2007 | Shibahara | 384/107 |
| 2007/0196035 | A1* | 8/2007 | Shibahara et al. | 384/107 |
| 2007/0278881 | A1 | 12/2007 | Yamashita et al. | |
| 2008/0037916 | A1* | 2/2008 | Hayashi et al. | 384/107 |
| 2008/0080797 | A1* | 4/2008 | Asada et al. | 384/107 |
| 2011/0317949 | A1 | 12/2011 | Ito et al. | |

FOREIGN PATENT DOCUMENTS

| | | | | |
|---|---|---|---|---|
| JP | 08084453 A | * | 3/1996 | ............ H02K 7/08 |
| JP | 11-190344 A | | 7/1999 | |
| JP | 11-294458 A | | 10/1999 | |
| JP | 2002-161912 A | | 6/2002 | |
| JP | 2002-168240 A | | 6/2002 | |
| JP | 2003-307213 A | | 10/2003 | |
| JP | 2004183865 A | * | 7/2004 | ............ F16C 17/10 |
| JP | 2005127525 A | * | 5/2005 | ............ F16C 17/10 |
| JP | 2005-265180 A | | 9/2005 | |
| JP | 2005337307 A | * | 12/2005 | ............ F16C 17/10 |
| JP | 2006-077863 A | | 3/2006 | |
| JP | 2007-250095 A | | 9/2007 | |
| JP | 2009-281464 A | | 12/2009 | |
| JP | 2010-223246 A | | 10/2010 | |
| WO | WO 2008096465 A1 | * | 8/2008 | ............ F16C 33/74 |
| WO | WO 2010044327 A1 | * | 4/2010 | ............ F16C 17/10 |
| WO | 2010/106909 A1 | | 9/2010 | |

OTHER PUBLICATIONS

International Preliminary Report on Patentability (Form PCT/IB/373) of International Application No. PCT/JP2012/054863 dated Sep. 19, 2013, with Form PCT/ISA/237.
Office Action dated Apr. 17, 2014, issued in Japanese Patent Application No. 2011-050946 (3 pages).
International Search Report of PCT/JP2012/054863, mailing date of Apr. 3, 2012.

* cited by examiner

FLUID DYNAMIC BEARING DEVICE

CROSS-REFERENCE TO RELATED APPLICATIONS

This is a 371 of International Application No. PCT/JP2012/054863, filed on Feb. 28, 2012, which claims the benefit of priority from the prior Japanese Patent Application Nos. 2011-050946, filed on Mar. 9, 2011, 2011-050949 filed on Mar. 9, 2011, 2011-050950 filed on Mar. 9, 2011 and 2012-012019 filed on Jan. 24, 2012 the entire contents of which are incorporated herein by reference.

TECHNICAL FIELD

The present invention relates to a fluid dynamic bearing device for supporting a shaft member through a dynamic pressure action of a lubricating fluid, which is generated in a radial bearing gap and a thrust bearing gap, so as to freely allow relative rotation of the shaft member.

BACKGROUND ART

Fluid dynamic bearing devices are excellent in rotational accuracy and quietness, and hence are suitably used, for example, in a spindle motor for various disk drive devices (such as a magnetic disk drive device for HDDs and an optical disk drive device for CD-ROMs and the like), a polygon scanner motor for laser beam printers (LBPs), or a color-wheel motor for projectors.

For example, the fluid dynamic bearing device disclosed in Patent Literature 1 includes a shaft member including a shaft portion and a flange portion, and a bearing sleeve made of a sintered metal and having an inner periphery along which the shaft portion is inserted. Along with rotation of the shaft member, radial bearing gaps are formed between an outer peripheral surface of the shaft portion and an inner peripheral surface of the bearing sleeve, and a thrust bearing gap is formed between one end surface of the flange portion and one end surface of the bearing sleeve. The inner peripheral surface of the bearing sleeve is provided with radial dynamic pressure generating portions (dynamic pressure generating grooves) for generating a dynamic pressure action in a lubricating oil in the radial bearing gaps, and the one end surface of the bearing sleeve is provided with a thrust dynamic pressure generating portion (dynamic pressure generating grooves) for generating a dynamic pressure action in a lubricating oil in the thrust bearing gap.

Patent Literature 2 discloses a method of forming dynamic pressure generating grooves in the inner peripheral surface of the bearing sleeve made of a sintered metal. In this method, sizing and rotary sizing are performed on a cylindrical sintered metal preform obtained by sintering a green compact of metal powder, and then the dynamic pressure generating grooves are formed in the inner peripheral surface of the sintered metal preform. Specifically, a forming pin provided with a groove pattern for forming the dynamic pressure generating grooves is inserted along an inner periphery of the sintered metal preform, and then the sintered metal preform is held with an upper punch and a lower punch from both sides in an axial direction. In this state, an outer peripheral surface of the sintered metal preform is press-fitted to a die. With this, a compressive force is applied, and the inner peripheral surface is pressed onto the groove pattern and plastically deformed. In this way, the dynamic pressure generating grooves are formed in the inner peripheral surface of the sintered metal preform. Alternatively, when the groove pattern is provided to the upper punch or the lower punch described above, and one end surface of the sintered metal preform is pressed onto the groove pattern, dynamic pressure generating grooves are formed also in the one end surface of the bearing sleeve simultaneously with the formation of the dynamic pressure generating grooves in the inner peripheral surface of the bearing sleeve.

Further, a fluid dynamic bearing device incorporated, for example, in a spindle motor for disk drive devices includes a radial bearing portion for supporting relative rotation of a bearing member and a shaft member in radial directions, and a thrust bearing portion for supporting relative rotation of the bearing member and the shaft member in thrust directions. Of both the bearing portions, the radial bearing portion is generally formed of what is called a fluid dynamic bearing. When the radial bearing portion is formed of the fluid dynamic bearing, a plurality of recessed portions (for example, dynamic pressure generating grooves) for generating a fluid dynamic pressure in a radial bearing gap are provided to an inner peripheral surface of the bearing member or an outer peripheral surface of the shaft member, which face each other across the radial bearing gap. The dynamic pressure generating grooves are generally formed into fine grooves having a groove depth and a groove width of from approximately several micrometers to several tens of micrometers. As a method of forming such fine grooves with high accuracy, the method described, for example, in Patent Literature 4 is publicly known.

Specifically, the method includes: inserting a core rod having an outer peripheral surface provided with a groove-patterned portion in conformity with a shape of dynamic pressure generating grooves along an inner periphery of a cylindrical sintered metal preform to be processed into a bearing member; applying, in this state, a compressive force to the sintered metal preform; causing an inner peripheral surface of the sintered metal preform to bite into the outer peripheral surface of the core rod so as to transfer a shape of the groove-patterned portion to the inner peripheral surface of the sintered metal preform; and then withdrawing the core rod from the inner periphery of the sintered metal preform by utilizing spring-back of the sintered metal preform, which is generated along with release of the compressive force, without deforming the dynamic pressure generating grooves.

However, when the dynamic pressure generating grooves are molded in the inner peripheral surface of the sintered metal preform as described above, a significantly greater compressive force needs to be applied to the sintered metal preform. Thus, a significantly greater force is applied also to the core rod and dies arranged on an outer periphery of the sintered metal preform so as to hold an outer peripheral surface of the sintered metal preform. As a result, the core rod and the dies are liable to be subjected to abrasion and the like, and hence the dies need to be frequently replaced, which causes an increase in cost of forming the dynamic pressure generating grooves, by extension, manufacturing cost of the fluid dynamic bearing device. As a countermeasure, as means for reducing the cost of forming the dynamic pressure generating grooves, attention has been drawn again to the formation of the dynamic pressure generating grooves in the outer peripheral surface of the shaft member.

The shaft member is generally made of a metal material excellent in strength and rigidity, such as quenched stainless steel. As a method of forming the plurality of dynamic pressure generating grooves in the outer peripheral surface of the shaft member made of such metals, there may be employed trimming, etching, rolling, or the like. Of those, the rolling tends to be used in many cases because dynamic pressure generating grooves of high accuracy can be formed relatively easily at low cost. For example, Patent Literature 5 describes a specific procedure generally employed for forming, by rolling, the dynamic pressure generating grooves in the outer peripheral surface of the shaft member. Specifically, the procedure includes: pressing rolling dies onto a shaft preform finished to have a predetermined axial diameter so as to form dynamic pressure generating grooves in an outer peripheral surface of the shaft preform; performing heat treatment on the shaft preform so as to obtain a quenched shaft; and performing last finishing such as grinding on the outer peripheral surface of the quenched shaft provided with the dynamic pressure generating grooves, to thereby obtain a shaft member as a finished product having an outer peripheral surface finished to have predetermined accuracy together with the dynamic pressure generating grooves and hill portions that define the dynamic pressure generating grooves.

Further, when the thrust bearing portion is formed of what is called a dynamic pressure bearing, a flanged shaft member including a shaft portion and a flange portion is normally used as the shaft member. In this case, the radial bearing gap of the radial bearing portion is formed between an outer peripheral surface of the shaft portion and a surface opposed thereto, and the thrust bearing gap of the thrust bearing portion is formed between an end surface of the flange portion and a surface opposed thereto.

As the flanged shaft member, there are used an integrated type in which the shaft portion and the flange portion are formed integrally with each other by a machining process such as the trimming, and a separate type in which the shaft portion and the flange portion are produced separately from each other and then integrated with each other by appropriate means. The integrated type flanged shaft member is advantageous in that accuracy between the shaft portion and the flange portion (such as perpendicularity) can be easily enhanced, and hence high rotational accuracy of the fluid dynamic bearing device can be secured. However, in addition to requirement of dedicated processing equipment, material loss is significant, and hence markedly high production cost is required. Meanwhile, the separate type flanged shaft member is advantageous in that properties required for each of the shaft portion and the flange portion can be easily satisfied, and in addition, the separate type flanged shaft member can be mass-produced at cost lower than that of the integrated type flanged shaft member.

In particular, as in the case of the flanged shaft member described in Patent Literature 6, when a thrust dynamic pressure generating portion (in which dynamic pressure generating grooves for generating a fluid dynamic pressure in a thrust bearing gap are arrayed in a herringbone pattern and the like) is molded in each end surface of the flange portion through a pressing process, and simultaneously, the flange portion is fixed to one end of the shaft portion, a manufacturing step of the shaft member is simplified, and another thrust dynamic pressure generating portion need not be provided to an end surface of a member, which faces the end surface of the flange portion across the thrust bearing gap. Thus, a manufacturing step of the fluid dynamic bearing device can be simplified, and hence manufacturing cost of the fluid dynamic bearing device can be reduced.

CITATION LIST

Patent Literature 1: JP 2007-250095 A
Patent Literature 2: JP 11-190344 A
Patent Literature 3: JP 2005-265180 A
Patent Literature 4: JP 11-294458 A
Patent Literature 5: JP 7-114766 A
Patent Literature 6: JP 7-296502 A

SUMMARY OF INVENTION

Technical Problems

In the groove forming step described above, the forming pin to be inserted along the inner periphery of the sintered metal preform, the upper punch, or the lower punch needs to be provided with a groove pattern in conformity with the dynamic pressure generating grooves having a markedly fine shape, and hence die cost is markedly high. In particular, the forming pin needs to be withdrawn from an inner periphery of a bearing sleeve after forming the dynamic pressure generating grooves. At this time, the groove pattern of the forming pin and the dynamic pressure generating grooves of an inner peripheral surface of the bearing sleeve interfere with each other in the axial direction, and hence the groove pattern is liable to be abraded. As a result, the forming pin needs to be frequently replaced, which may cause a further increase in die cost.

Further, when the dynamic pressure generating grooves are formed in the bearing sleeve in a sizing step, as disclosed in Patent Literature 3, recessed portions of the groove pattern cannot be filled with a material of the sintered metal preform, and hence there is a risk of what is called "shear drop," that is, reduction in height at both edges of the hill portion between the dynamic pressure generating grooves (difference in diameter between both the edges of the hill portion and a groove bottom surface of the dynamic pressure generating groove) in the axial direction. When the height of the hill portion is small, a bearing gap formed between the hill portion and a surface opposed thereto is enlarged. Thus, pressure of the lubricating fluid in the bearing gap cannot be sufficiently increased. As a result, a bearing rigidity is reduced. According to Patent Literature 3, a smooth surface facing a region of the dynamic pressure generating grooves is defined with a step so as to be smaller in length than the region of the dynamic pressure generating grooves, to thereby prevent deterioration in bearing rigidity. However, even by this method, the shear drop of the hill portion between the dynamic pressure generating grooves cannot be eliminated, and the bearing rigidity is inevitably reduced to some extent.

Further, as described in Patent Literature 5, due to ease of plastic flow of deformable parts of the preform, when a rolling process is performed on the shaft preform that has not yet been subjected to the heat treatment, there is an advantage in that the dynamic pressure generating grooves can be easily formed. However, along with pressing with the rolling dies, a thickness of the preform significantly increases on both sides of each projecting portion 140, and hence groove depths of dynamic pressure generating grooves 141 are liable to significantly vary from each other (refer to FIG. 14). In addition, the heat treatment is performed under a state in which internal stress is accumulated in the shaft preform, and hence deformation due to distortion is liable to occur. For those reasons, there are problems in that it is essential to perform last finishing such as grinding so as to secure desired rotational accuracy, and a large area of the deformable parts is machined by the last finishing (significant material loss).

Further, when the heat treatment is performed on the shaft preform, a surface oxide film called "black scale" is formed on a surface of the quenched shaft (surface layer portion of a hardened surface layer). While the black scale is left, bearing performance may be deteriorated by contaminants derived from the black scale that has peeled off along with an increase in fluid pressure in the radial bearing gap during operation of the bearing. As a countermeasure, during the manufacturing step of the shaft member, a removal process for removing the black scale is generally performed in addition to the last finishing such as grinding. As in the procedure described above, when the heat treatment is performed on the shaft preform after forming the dynamic pressure generating grooves, the black scale is left also in the dynamic pressure generating grooves, and it is not easy to perfectly remove the black scale left in the dynamic pressure generating grooves that have been formed into fine grooves having a groove depth and a groove width each set in a micron order. As a matter of course, the black scale left in the dynamic pressure generating grooves can be removed by performing a removal process such as barreling. However, a batch process is required, causing an increase in processing cost.

By the way, as disclosed, for example, in Patent Literature 6, the flange portion is generally made of an ingot material (solid metal material such as stainless steel). When a pressing process is performed on the flange portion made of the ingot material so as to mold the dynamic pressure generating grooves in each of the end surfaces of the flange portion with high accuracy and simultaneously firmly fix the flange portion to the one end of the shaft portion, a significantly greater compressive force needs to be applied from both sides in the axial direction of the flange portion. However, when the flange portion made of the ingot material is strongly pressurized, a higher degree of spring-back is generated along with release of the compressive force. Thus, it is difficult to finish, in particular, the end surfaces of the flange portion, to have flatness and the like of predetermined accuracy so as to prevent influence on rotational accuracy in the thrust directions. When a finishing process such as a correction process and grinding is performed after the pressing process, the end surfaces of the flange portion can be finished to have predetermined accuracy. However, a larger number of steps are performed, causing an increase in manufacturing cost.

It is a first object of the present invention to provide a fluid dynamic bearing device that can be produced at low cost and has a high bearing rigidity.

Further, it is a second object of the present invention to enable recessed portions for generating a dynamic pressure action in a lubricating fluid interposed in radial bearing gaps to be formed in an outer peripheral surface of a shaft member by rolling with less time and effort and with high accuracy, to thereby reduce cost of a fluid dynamic bearing device capable of exerting desired bearing performance.

Still further, it is a third object of the present invention to enable easy manufacturing of a separate type flanged shaft member that is excellent in accuracy of thrust dynamic pressure generating portions to be provided to end surfaces of a flange portion, and in fastening strength of the flange portion with respect to a shaft portion, to thereby contribute to reduction in cost of a fluid dynamic bearing device excellent particularly in rotational accuracy in thrust directions.

Solution to Problems

[Summary of First Invention of Present Application]

According to a first invention of the present application, which is made to achieve the above-mentioned first object, there is provided a fluid dynamic bearing device, comprising: a shaft member comprising: a shaft portion; and a flange portion; a bearing sleeve made of a sintered metal and having an inner periphery along which the shaft portion is inserted; a radial bearing gap formed between an outer peripheral surface of the shaft portion and an inner peripheral surface of the bearing sleeve; a radial dynamic pressure generating portion that is formed on the outer peripheral surface of the shaft portion and generates a dynamic pressure action in a lubricating fluid in the radial bearing gap; a first thrust bearing gap formed between one end surface of the flange portion and one end surface of the bearing sleeve; and a first thrust dynamic pressure generating portion that is formed on the one end surface of the flange portion and generates a dynamic pressure action in a lubricating fluid in the first thrust bearing gap, the shaft member being configured to be supported by the dynamic pressure action of the lubricating oil, which is generated in the radial bearing gap, and the dynamic pressure action of the lubricating oil, which is generated in the first thrust bearing gap, so as to freely allow relative rotation of the shaft member, in which the entire inner peripheral surface of the bearing sleeve is formed into a smooth cylindrical surface, and in which the entire one end surface of the bearing sleeve is formed into a flat surface.

In this way, the inner peripheral surface and the one end surface of the bearing sleeve made of a sintered metal are each formed into the smooth cylindrical surface or the flat surface that does not have a dynamic pressure generating portion. Thus, a step of forming the dynamic pressure generating portion (groove forming step) can be omitted from a manufacturing step of the bearing sleeve. As a result, expensive dies provided with a groove pattern, such as a forming pin and a punch, are not required. In addition, pattern abrasion due to interference between dynamic pressure generating portions of a sintered metal preform and the groove pattern of the forming pin does not occur. As a result, cost of the dies can be markedly reduced. Further, the inner peripheral surface of the bearing sleeve is formed into the smooth cylindrical surface, and hence the radial dynamic pressure generating portion is formed on the outer peripheral surface of the shaft member. However, the outer peripheral surface of the shaft portion is accessible to tools such as a molding die, and hence the radial dynamic pressure generating portion can be formed easily with high accuracy. As a result, accuracy of the radial bearing gap and a bearing rigidity are enhanced.

In the above-mentioned fluid dynamic bearing device, the radial dynamic pressure generating portion may comprise a plurality of radial dynamic pressure generating portions formed in a plurality of regions spaced apart from each other in an axial direction on the outer peripheral surface of the shaft portion, and the shaft portion may have a relief portion radially smaller than the plurality of radial dynamic pressure generating portions between the plurality of regions in the axial direction. In this way, when the relief portion is formed in the outer peripheral surface of the shaft portion, the inner peripheral surface of the bearing sleeve, which comprises a region facing the relief portion, can be formed into the smooth cylindrical surface.

When the flange portion is made of a sintered metal, both the flange portion and the bearing sleeve that face each other across the first thrust bearing gap are made of a sintered metal. Thus, the lubricating fluid is supplied from surface pores of those surfaces into the first thrust bearing gap, and hence lubricity is enhanced. At this time, when the same type of sintered metals are used for forming the flange portion and the bearing sleeve (in other words, sintered metals containing the same main component), both the members may adhere to each other, and hence it is preferred that both the members be made of sintered metals containing different main components. For example, the bearing sleeve is formed into the simple shape that does not have the dynamic pressure generating portion, and hence it is preferred that the bearing sleeve be made of an iron-based sintered metal excellent in abrasion resistance (sintered metal containing iron of 50 mass % or more). The flange portion comprises the first thrust dynamic pressure generating portion, and hence it is preferred that the flange portion be made of a copper-based sintered metal excellent in processability (sintered metal containing copper of 50 mass % or more).

The above-mentioned fluid dynamic bearing device may further comprise: a housing comprising: a side portion having a cylindrical shape, an inner peripheral surface of the side portion is fixed to the bearing sleeve; and a bottom portion closing an opening portion at one end of the side portion; a second thrust bearing gap formed between an end surface of the bottom portion of the housing and another end surface of the flange portion; and a second thrust dynamic pressure generating portion that is formed on the another end surface of the flange portion and generates a dynamic pressure action in a lubricating fluid in the second thrust bearing gap. At least a region on the end surface of the bottom portion of the housing, which faces the second thrust dynamic pressure generating portion, may be formed of a flat surface. With this, the housing can be formed into a simple shape that does not have the dynamic pressure generating portions. For example, when the housing is made of a metal, a pressing die for forming the bottom portion of the housing need not be provided with a groove pattern, and hence die cost can be reduced. Further, when the housing is made of a resin, a die set is not provided with a groove pattern, and hence fluidity of a molten resin in a cavity can be enhanced. Thus, resin materials for molding the housing can be selected from a wider range of options, specifically, can be selected based, for example, on strength rather than the fluidity.

The radial dynamic pressure generating portion may be formed, for example, by a rolling process. In this case, when the rolling process is performed on an outer peripheral surface of a shaft preform that has increased in hardness through heat treatment, the outer peripheral surface of the shaft preform scarcely increases in thickness through the rolling process. As a result, the radial dynamic pressure generating portion of high accuracy can be obtained.

When a radially outermost surface of the radial dynamic pressure generating portion is formed of a ground surface, accuracy of the surface can be enhanced. Thus, the radial bearing gap formed between the ground surface and the cylindrical inner peripheral surface of the bearing sleeve is set with high accuracy, and hence the bearing rigidity can be further enhanced.

[Summary of Second Invention of Present Application]

Further, based on a finding that a required depth dimension of recessed portions for generating dynamic pressure action in a lubricating fluid interposed in the radial bearing gap (dynamic pressure generating recessed portions) is set in a micron order, the inventors of the present application have found specific means for achieving the above-mentioned object.

Specifically, according to a second invention of the present application, which is made to achieve the above-mentioned second object, there is provided a fluid dynamic bearing device, comprising: a bearing member; a shaft member inserted along an inner periphery of the bearing member; a radial bearing gap formed between an inner peripheral surface of the bearing member and an outer peripheral surface of the shaft member, the outer peripheral surface of the shaft member having a plurality of recessed portions for generating a dynamic pressure action in a lubricating fluid interposed in the radial bearing gap, in which the shaft member has a hardened surface layer formed by performing heat treatment on a shaft preform, and in which the plurality of recessed portions are formed by performing a rolling process on the hardened surface layer. Note that, a shape of the "plurality of recessed portions" is not particularly limited herein, and may comprise not only what is called dynamic pressure generating grooves such as axial grooves extending in an axial direction, and inclined grooves inclined with respect to the axial direction, but also dimples (recesses) and the like.

As described above, the required depth dimension of the plurality of dynamic pressure generating recessed portions provided to the outer peripheral surface of the shaft member is set in a micron order. Thus, even when the rolling process is performed on the hardened surface layer (quenched shaft) formed by the heat treatment, the plurality of recessed portions can be formed to have a predetermined depth dimension. In this way, when the plurality of recessed portions are formed by performing the rolling process on the hardened surface layer, a thickness increase on both sides of a projecting portion, which is caused by the rolling, is reduced in comparison with a case of performing the rolling process on a shaft preform that has not yet been subjected to the heat treatment. Thus, variation in depth dimension of the plurality of recessed portions can be suppressed. In addition, it is no longer necessary to perform the heat treatment on the shaft preform after the plurality of recessed portions are formed by rolling, in other words, under a state in which internal stress is accumulated in the shaft preform, and hence deformation due to distortion is less liable to occur. Thus, depending on cases, last finishing can be omitted, or a processing amount thereof can be reduced even when the last finishing is performed. Further, with the configuration of this invention, a removal step of removing black scale formed on a surface layer portion of the hardened surface layer (external surface of the quenched shaft) can be performed prior to the rolling process. The outer peripheral surface of the quenched shaft before the rolling process has a shape of a substantially smooth cylindrical surface that does not have fine projections and recesses such as the plurality of dynamic pressure generating recessed portions, and hence the black scale can be easily removed. As a result, a problem of deterioration in bearing performance, which may be caused by contaminants derived from the black scale that has peeled off from the shaft member, is less liable to occur.

In order to effectively provide the advantages described above, it suffices that the hardened surface layer be formed to have a hardness of HV 450 or more, and the rolling process be performed on the hardened surface layer.

The radial bearing gap may comprise two radial bearing gaps formed at two positions spaced apart from each other in the axial direction. With this, a moment rigidity can be enhanced while suppressing an increase in rotational torque. In this case, it is desired that, on the outer peripheral surface of the shaft portion, a cylindrical middle relief portion formed to have a diameter smaller than that of bottom portions of the plurality of recessed portions be provided in a region located between the two radial bearing gaps. With this, the inner peripheral surface of the bearing member is formed into a perfectly circular cylindrical surface having a uniform diameter, and manufacturing cost thereof can be reduced. In addition, a lubricating fluid pool can be formed between the outer peripheral surface of the shaft portion and the inner peripheral surface of the bearing member. When the lubricating fluid pool is provided between the two radial bearing gaps adjacent to each other in the axial direction, the two radial bearing gaps can be constantly filled with an ample amount of the lubricating fluid. Thus, rotational accuracy in the radial direction is stabilized.

When the bearing member is made of a sintered metal, the lubricating fluid retained in internal pores thereof can be caused to seep into the radial bearing gap. Therefore, a situation such as deficiency of the lubricating fluid to be interposed in the two radial bearing gaps can be more effectively prevented. Further, in the configuration of this invention, the plurality of recessed portions for generating a fluid dynamic pressure in the radial bearing gap are provided to the outer peripheral surface of the shaft member. Thus, the plurality of dynamic pressure generating recessed portions need not be provided to the inner peripheral surface of the bearing member, and hence the inner peripheral surface of the bearing member can be formed into a smooth cylindrical surface. Thus, even when the bearing member is made of a sintered metal, the increase in manufacturing cost, which may occur in a case of molding the plurality of dynamic pressure generating recessed portions in the inner peripheral surface of the bearing member made of a sintered metal, can be prevented as much as possible.

The shaft member may comprise a shaft portion provided with the plurality of dynamic pressure generating recessed portions, and a flange portion that is provided at one end of the shaft portion and forms a thrust bearing gap between the flange portion and an end surface of the bearing member. The shaft member and the flange portion may be provided integrally with each other. However, in the configuration of this invention, the plurality of dynamic pressure generating recessed portions are formed by rolling, and hence processability of the plurality of dynamic pressure generating recessed portions may be deteriorated when the flange portion is provided integrally with the shaft portion. Thus, it is desired that the flange portion be fixed to the one end of the shaft portion by appropriate means. A method of fixing the flange portion to the shaft portion is not particularly limited, and there may be employed press-fitting, bonding, press-fit bonding (combination of press-fitting and bonding), welding, fusing, crimping, and the like in accordance with a shape of the flange portion, types of a forming material, and the like.

In this case, the end surface of the flange portion, which forms the thrust bearing gap between the end surface of the flange portion and the end surface of the bearing member, may comprise a plurality of recessed portions for generating a fluid dynamic pressure in the thrust bearing gap. With this, the plurality of recessed portions for generating a fluid dynamic pressure in the thrust bearing gap need not be formed in the end surface of the bearing member, which faces the end surface of the flange portion across the thrust bearing gap. As a result, manufacturing cost of the bearing member can be reduced.

The fluid dynamic bearing device described above according to this invention can be suitably used when being incorporated in a motor comprising stator coils and a rotor magnet, such as a spindle motor for disk drive devices.

Further, in order to achieve the above-mentioned second object, according to the second invention of the present application, there is provided a method of manufacturing a fluid dynamic bearing device, the fluid dynamic bearing device comprising: a bearing member; a shaft member inserted along an inner periphery of the bearing member; a radial bearing gap formed between an inner peripheral surface of the bearing member and an outer peripheral surface of the shaft member, the outer peripheral surface of the shaft member having a plurality of recessed portions for generating a dynamic pressure action in a lubricating fluid interposed in the radial bearing gap, the method comprising the steps of: heat-treating a shaft preform so as to form a quenched shaft having a hardened surface layer; and rolling the hardened surface layer of the quenched shaft so as to form the plurality of recessed portions.

In this case, it is desired that rolling dies to be used in the rolling each comprise at least a recessed portion forming portion for forming the plurality of recessed portions, the recessed portion forming portion being formed to have a hardness that is HV 100 or more higher than that of the hardened surface layer of the quenched shaft. With this, the plurality of dynamic pressure generating recessed portions can be formed with a predetermined shape and predetermined depth in the hardened surface layer.

The method may further comprise, between the heat-treating and the rolling, removing a surface layer portion (black scale) of the hardened surface layer. As described above, in the configuration of this invention, the outer peripheral surface of the quenched shaft before the rolling has the shape of a substantially smooth cylindrical surface that does not have fine projections and recesses, and hence the black scale can be easily removed. As a result, the problem of deterioration in bearing performance, which may be caused by the contaminants derived from the black scale that has peeled off from the shaft member, can be easily prevented.

The method may further comprise, subsequently to the rolling, finishing the outer peripheral surface of the quenched shaft to have predetermined accuracy. As described above, when the configuration of this invention is employed, the amount of thickness increase caused by the rolling can be reduced. In addition, a degree of deformation caused by quenching is reduced, and hence the finishing may be omitted depending on cases. Thus, it suffices that the finishing be provided when necessary. Note that, types of the finishing are not particularly limited, and there may employed grinding, polishing, plastic working, and the like.

[Summary of Third Invention of Present Application]

According to a third invention of the present application, which is made to achieve the above-mentioned third object, there is provided a fluid dynamic bearing device, comprising: a shaft member comprising: a shaft portion; and a flange portion; a radial bearing gap defined by an outer peripheral surface of the shaft portion; a thrust bearing gap defined by an end surface of the flange portion; and a thrust dynamic pressure generating portion for generating a fluid dynamic pressure in the thrust bearing gap, in which the flange portion is obtained by forming a sintered metal into an annular shape, in which the thrust dynamic pressure generating portion is molded in one end surface of the flange portion by a pressing process, and in which the flange portion is fixed to the shaft portion by holding a bulging portion, which is formed on an inner peripheral surface of the flange portion along with the pressing process, in close contact with the outer peripheral surface of the shaft portion.

As described above, when the flange portion is made of a sintered metal, through adjustment of porosity (density of flange preform) of a porous structure of the flange portion (flange preform to be finished into the flange portion), a deformation amount (degree of plastic deformation) of the flange preform along with the pressing process can be optimized. In other words, through adjustment of the porosity, measures such as enhancement in formability of the thrust dynamic pressure generating portion molded in the end surface, enhancement in fastening strength of the flange portion with respect to the shaft portion, and enhancement of both the formability and the fastening strength can be easily selected. In addition, a degree of spring-back generated along with release of a compressive force applied at the time of the molding can also be adjusted. Thus, even when a correction process and a finishing process after the pressing process are omitted, it is possible to easily mass-produce, at low cost, a separate type flanged shaft member that is excellent, for example, in molding accuracy of the thrust dynamic pressure generating portion, in accuracy of the end surface of the flange portion, and in fastening strength of the flange portion with respect to the shaft portion.

Further, the flange portion having the end surface that forms the thrust bearing gap is made of a sintered metal. Thus, during operation of the fluid dynamic bearing device, a lubricating fluid retained in internal pores of the flange portion is supplied to the thrust bearing gap. Therefore, a probability of occurrence of failures such as generation of negative pressure in a part of a region in the thrust bearing gap due to deficiency of the amount of the lubricating fluid to be interposed in the thrust bearing gap can be reduced as much as possible. As a result, rotational accuracy in the thrust directions is stably maintained. Further, the thrust dynamic pressure generating portion is molded by the pressing process, and hence, in the flange portion, a density of at least a region provided with the thrust dynamic pressure generating portion is set to be high. As a result, abrasion resistance is enhanced.

A press-fit fixation portion formed by press-fitting the flange preform (annular member made of a sintered metal and formed into the flange portion along with the pressing process) to the shaft portion may be provided between the outer peripheral surface of the shaft portion and the inner peripheral surface of the flange portion, which face each other. When the press-fit fixation portion is provided, at the time of performing the pressing process on the flange preform, a posture of the flange preform with respect to the shaft portion is less liable to be disturbed. As a result, advantages can be obtained in molding the thrust dynamic pressure generating portion of high accuracy, and in providing the shaft member excellent in accuracy between the shaft portion and the flange portion (such as perpendicularity between the outer peripheral surface of the shaft portion and the end surface of the flange portion, and coaxiality between the shaft portion and the flange portion).

When the outer peripheral surface of the shaft portion is provided with a recessed portion for receiving the bulging portion, the shaft portion and the flange portion can be held in contact with each other over a larger area. Thus, the fastening strength of the flange portion with respect to the shaft portion (pull-out resistance of the flange portion) can be further enhanced. The recessed portion may be formed into any form such as numerous recessed portions provided in a dispersed manner, and a circumferential groove extending in a circumferential direction of the shaft portion. The circumferential groove as the recessed portion may be provided continuously over an entire periphery of the shaft portion, or may be provided intermittently or partially to the outer peripheral surface of the shaft portion.

When the recessed portion is formed of the circumferential groove, it is conceivable that the pull-out resistance of the flange portion can be enhanced in proportion to the number of the circumferential grooves to be provided (number of the circumferential grooves to be provided in the axial direction; the same applies hereinafter). However, a thickness of the flange portion is limited, and hence, in order to provide the large number of circumferential grooves in the axial direction, it is necessary to set a groove width of each of the circumferential grooves to be small. In this case, smoothness of inflow of deformable parts into the circumferential grooves is deteriorated, and the pull-out resistance of the flange portion cannot be effectively enhanced. Further, when a region provided with the recessed portions occupies a larger area in a region facing the inner peripheral surface of the flange portion on the outer peripheral surface of the shaft portion as a result of, for example, providing the large number of circumferential grooves in the axial direction, fixing accuracy of the flange portion with respect to the shaft portion is liable to be adversely affected. Thus, it is not always necessary to increase the number of the circumferential grooves to be provided. In view of this, it is desired that the circumferential groove as the recessed portion to be provided to the outer peripheral surface of the shaft portion be provided at two positions spaced apart from each other in the axial direction on the outer peripheral surface of the shaft portion. In particular, it is desired that the groove width of each of the circumferential grooves be set to be 5% or more and 20% or less of the thickness of the flange portion. Further, in order to enhance the smoothness of inflow of the deformable parts into the circumferential grooves, it is desired that the circumferential grooves as the recessed portions be each formed into a tapered shape in cross-section, in which the groove width is gradually reduced toward a groove bottom side.

In the configuration described above, the flange preform may be partially plastically deformed to form a crimp portion for crimping and fixing the flange portion with respect to the shaft portion. With this, the fastening strength of the flange portion with respect to the shaft portion can be much further enhanced.

The fluid dynamic bearing device according to the third invention of the present application may further comprise a bearing sleeve that forms the radial bearing gap between the bearing sleeve and the outer peripheral surface of the shaft portion inserted along an inner periphery of the bearing sleeve, and forms the thrust bearing gap between the bearing sleeve and the end surface of the flange portion. In consideration of processability (formability) and efficiency of supply of the lubricating fluid into both the bearing gaps, it is desired that the bearing sleeve be made of a sintered metal. However, in the configuration of this invention, the flange portion is made of a sintered metal. Thus, when the same type of sintered metals are used for forming the flange portion and the bearing sleeve (sintered metals containing the same main component), the flange portion and the bearing sleeve are liable to adhere to each other during operation of the bearing device. Thus, it is desired that the bearing sleeve be made of a sintered metal containing a main component different from that of the flange portion.

In a preferred configuration example, the flange portion is made of a sintered metal containing copper as a main component (copper-based sintered metal), and the bearing sleeve is made of a sintered metal containing iron as a main component (iron-based sintered metal). In this invention, the pressing process is performed on the flange preform (flange portion), and hence it is desired that the flange portion be made of a sintered metal containing, as a main component, copper having processability higher than that of iron. Further, normally, the bearing sleeve is a member having a volume larger than that of the flange portion, and hence it is desired that the bearing sleeve be made of a sintered metal containing, as a main component, iron less expensive than copper.

Note that, when not only the flange portion but also the bearing sleeve is made of a sintered metal, a larger amount of the lubricating fluid is interposed in an internal space of the fluid dynamic bearing device, which may be disadvantageous in enhancing bearing performance. As a countermeasure, when both the flange portion and the bearing sleeve are made of a sintered metal, it is desired that the flange portion and the bearing sleeve be made of a sintered compact having a density set to be high within a range in which satisfactory processability can be secured.

Further, in the configuration described above, the outer peripheral surface of the shaft portion may be provided with a radial dynamic pressure generating portion for generating a fluid dynamic pressure in the radial bearing gap. The radial dynamic pressure generating portion may be formed on a surface facing the outer peripheral surface of the shaft portion across the radial bearing gap (for example, inner peripheral surface of the bearing sleeve). However, in many cases, the radial dynamic pressure generating portion is formed of a plurality of fine dynamic pressure generating grooves provided in a circumferential direction. When the dynamic pressure generating grooves of this type are to be formed with high accuracy in the inner peripheral surface of the bearing sleeve, there is a high risk in that manufacturing cost becomes higher. Meanwhile, when the radial dynamic pressure generating portion is provided to the outer peripheral surface of the shaft portion, the fine dynamic pressure generating grooves can be formed with high accuracy by a combination of relatively simple means such as rolling and grinding, which is advantageous in reducing manufacturing cost.

The fluid dynamic bearing device described above according to this invention can be suitably used when being incorporated in a motor comprising stator coils and a rotor magnet, such as a spindle motor for disk drive devices.

Further, in order to achieve the above-mentioned third object, according to the third invention of the present application, there is provided a method of manufacturing a fluid dynamic bearing device, the fluid dynamic bearing device comprising: a shaft member comprising: a shaft portion; and a flange portion; a radial bearing gap defined by an outer peripheral surface of the shaft portion; a thrust bearing gap defined by an end surface of the flange portion; and a thrust dynamic pressure generating portion for generating a fluid dynamic pressure in the thrust bearing gap, the method comprising the steps of: externally fitting, to the shaft portion, a flange preform obtained by forming a sintered metal into an annular shape; pressurizing, in this state, the flange preform from both sides in an axial direction so as to mold the thrust dynamic pressure generating portion in an end surface of the flange preform; and bulging an inner peripheral surface of the flange preform to a radially inner side thereof so as to hold the flange preform in close contact with the outer peripheral surface of the shaft portion.

In the configuration described above, under a state in which the flange preform is press-fitted to the shaft portion, the flange preform can be pressurized from both the sides in the axial direction. In addition, the flange preform may be pressurized from both the sides in the axial direction while restricting bulging of the outer peripheral surface of the flange preform.

Further, at the time of pressurizing the flange preform from both the sides in the axial direction, the flange preform may be partially plastically deformed to form a crimp portion for crimping and fixing the flange portion with respect to the shaft portion.

Advantageous Effects of the Invention

As described above, according to the first invention of the present application, it is possible to obtain the fluid dynamic bearing device that can be produced at low cost and has a high bearing rigidity.

Further, according to the second invention of the present application, the above-mentioned recessed portions for generating the fluid dynamic pressure in the radial bearing gaps can be formed in the outer peripheral surface of the shaft member by rolling with less time and effort and with high accuracy. Thus, it is possible to reduce the cost of the fluid dynamic bearing device capable of exerting desired bearing performance.

Still further, according to the third invention of the present application, it is possible to easily manufacture the flanged shaft member that is excellent in accuracy of the thrust dynamic pressure generating portions to be provided to the end surfaces of the flange portion, and in fastening strength of the flange portion with respect to the shaft portion. Thus, it is possible to provide, at low cost, the fluid dynamic bearing device excellent particularly in rotational accuracy in the thrust directions.

DESCRIPTION OF EMBODIMENTS

Now, description is made of embodiments of the first invention of the present application with reference to FIGS. 1 to 4.

Figure 1:
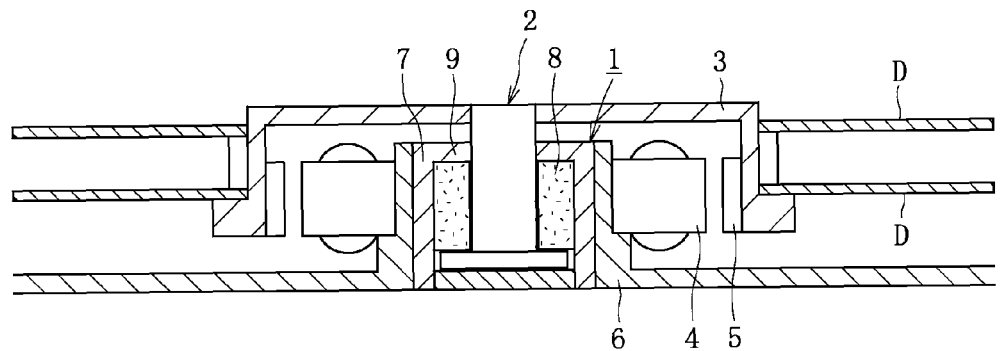
FIG. 1 is a sectional view of a spindle motor for HDDs.

FIG. 1 illustrates a spindle motor that incorporates a fluid dynamic bearing device 1 according to one embodiment of the present invention. This spindle motor is used for disk drive devices of, for example, a 2.5-inch HDD, and comprises the fluid dynamic bearing device 1 for rotatably supporting a shaft member 2, a bracket 6 to which the fluid dynamic bearing device 1 is fixed, and stator coils 4 and rotor magnets 5 facing each other across a radial gap. The stator coils 4 are fixed to the bracket 6, and the rotor magnets 5 are fixed to a disk hub 3. A predetermined number of disks D (two disks in FIG. 1) are mounted to the disk hub 3. When the stator coils 4 are energized, the rotor magnets 5 are rotated by an electromagnetic force between the stator coils 4 and the rotor magnets 5. With this, the shaft member 2, the disk hub 3, and the disks D are rotated integrally with each other.

Figure 2:
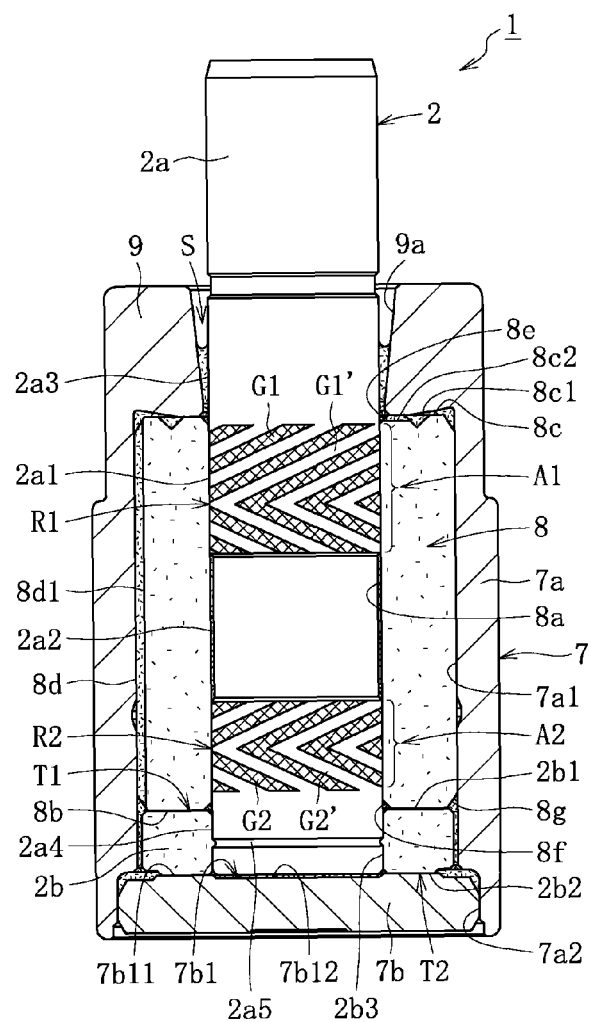
FIG. 2 is a sectional view of a fluid dynamic bearing device according to one embodiment of a first invention of the present application, which is incorporated in the spindle motor.

As illustrated in FIG. 2, the fluid dynamic bearing device 1 is formed of the shaft member 2, a bearing sleeve 8 having an inner periphery along which the shaft member 2 is inserted, a bottomed cylindrical housing 7 having an inner peripheral surface to which the bearing sleeve 8 is fixed, and a sealing portion 9 provided at an opening portion of the housing 7. In this embodiment, the housing 7 comprises a side portion 7a and a bottom portion 7b formed separately from each other, and the side portion 7a of the housing 7 and the sealing portion 9 are provided integrally with each other. Note that, for the sake of convenience in description, in an axial direction, the opening side and a closed side of the housing 7 are hereinafter referred to as an upper side and a lower side, respectively.

The shaft member 2 comprises a shaft portion 2a and a flange portion 2b provided at a lower end of the shaft portion 2a. In the example of the figure, the shaft portion 2a and the flange portion 2b are formed separately from each other. The shaft portion 2a is obtained by forming a metal material such as an ingot material, more specifically, stainless steel into a substantially straight axial shape. The shaft portion 2a has an outer peripheral surface 2a1 provided with radial bearing surfaces. In the example of the figure, the outer peripheral surface 2a1 is provided with radial bearing surfaces A1 and A2 at two positions spaced apart from each other in the axial direction. The radial bearing surfaces A1 and A2 are respectively provided with a plurality of dynamic pressure generating grooves G1 and G2 arrayed in a herringbone pattern as radial dynamic pressure generating portions (indicated by cross-hatching in FIG. 1). The dynamic pressure generating grooves G1 of the radial bearing surface A1 on the upper side are formed into an axially asymmetrical shape. Specifically, with respect to bent portions formed in an axial intermediate portion, an axial dimension of a region on the upper side is larger than an axial dimension of a region on the lower side. The dynamic pressure generating grooves G2 of the radial bearing surface A2 on the lower side are formed into an axially symmetrical shape.

A relief portion 2a2 radially smaller than the dynamic pressure generating grooves G1 and G2 is formed between the radial bearing surfaces A1 and A2 in the axial direction. A cylindrical surface 2a3 is provided above the radial bearing surface A1 on the upper side. In the example of the figure, the cylindrical surface 2a3 and a plurality of hill portions G1' provided in a circumferential direction between the dynamic pressure generating grooves G1 are flush with and continuous with each other. The cylindrical surface 2a3 faces, in a radial direction, an inner peripheral surface 9a of the sealing portion 9, and functions as a sealing surface for forming a sealing space S. A cylindrical surface 2a4 is provided below the radial bearing surface A2 on the lower side. In the example of the figure, the cylindrical surface 2a4 and a plurality of hill portions G2' provided in the circumferential direction between the dynamic pressure generating grooves G2 are flush with and continuous with each other. The cylindrical surface 2a4 functions as a fixing surface for fixing thereto an inner peripheral surface 2b3 of the flange portion 2b. The cylindrical surface 2a4 is provided with a recessed portion. In the example of the figure, an annular groove 2a5 is formed continuously over the entire periphery of the cylindrical surface 2a4. A part of the flange portion 2b fits into the annular groove 2a5.

The shaft portion 2a is produced by the following steps in the following order: (1) forming a shaft preform through lathing or forging; (2) performing heat treatment (quenching) on the shaft preform; (3) roughly grinding an outer peripheral surface of the shaft preform after the heat treatment; and (4)

performing a rolling process on the roughly ground outer peripheral surface of the shaft preform so as to form the dynamic pressure generating grooves G1 and G2. In this way, when the dynamic pressure generating grooves G1 and G2 are formed through the rolling process on the shaft preform that has increased in hardness (for example, Hv 450 or more) through the heat treatment, the outer peripheral surface of the shaft preform scarcely increases in thickness even through the rolling. As a result, the dynamic pressure generating grooves G1 and G2 (hill portions G1' and G2') of high accuracy can be formed. Further, radially outer surfaces of the hill portions G1' and G2', that is, radially outermost surfaces of the radial bearing surfaces A1 and A2 are each finished through rough grinding with high accuracy into a ground surface. Thus, radial bearing gaps of high accuracy can be formed. Note that, when necessary, after the dynamic pressure generating grooves G1 and G2 are formed, finish grinding may be performed on the outer peripheral surface 2a1 of the shaft portion 2a (in particular, radially outer surfaces of the hill portions G1' and G2').

The flange portion 2b is obtained by forming a metal material such as a sintered metal, more specifically, a copper-based sintered metal into a ring shape. In this embodiment, the flange portion 2b is made of a sintered metal containing, for example, copper of 60 mass %, and iron or stainless steel of 40 mass %, and having a density set within a range from 7.3 g/cm$^3$ to 8.0 g/cm$^3$. The flange portion 2b has an upper end surface 2b1 provided, as a first thrust dynamic pressure generating portion, with, for example, pump-in type dynamic pressure generating grooves, specifically, a plurality of pump-in type dynamic pressure generating grooves arrayed in a spiral pattern (not shown). Further, the flange portion 2b has a lower end surface 2b2 provided, as a second thrust dynamic pressure generating portion, with, for example, pump-in type dynamic pressure generating grooves, specifically, a plurality of pump-in type dynamic pressure generating grooves arrayed in a spiral pattern (not shown).

The inner peripheral surface 2b3 of the flange portion 2b is fixed to the cylindrical surface 2a4 at the lower end of the shaft portion 2a. In this embodiment, after sizing is performed on an annular sintered metal preform obtained by sintering a green compact of metal powder, the sintered metal preform is fitted (or lightly press-fitted) to the cylindrical surface 2a4 of the shaft portion 2a. In this state, the sintered metal preform is compressed from above and below with an upper punch and a lower punch (none of which is shown) each provided with groove patterns for forming the dynamic pressure generating grooves. In this way, the grooves patterns of the upper and lower punches are pressed onto both end surfaces of the sintered metal preform, to thereby form the dynamic pressure generating grooves. Simultaneously, an inner peripheral surface of the sintered metal preform radially shrinks to be pressed onto the cylindrical surface 2a4 of the shaft portion 2a. As a result, the flange portion 2b is fixed to the cylindrical surface 2a4 of the shaft portion 2a. At this time, the part of the flange portion 2b is fitted into the annular groove 2a5 of the shaft portion 2a so as to increase a fixation force between the flange portion 2b and the shaft portion 2a, and in particular, enhance pull-out resistance in the axial direction. Note that, a method of fixing the flange portion 2b and the shaft portion 2a to each other is not limited to the method described above. For example, press-fitting, bonding, welding, or fusing may be employed. Further, the flange portion 2b may be fixed to the shaft portion 2a after the dynamic pressure generating grooves are formed in both end surfaces 2b1 and 2b2 of the flange portion 2b.

The bearing sleeve 8 is obtained by forming a sintered metal, specifically, an iron-based sintered metal into a substantially cylindrical shape. In this embodiment, the bearing sleeve 8 is made of a sintered metal containing iron of 70 mass % to 90 mass % and copper of 30 mass % to 10 mass %, and having a density set within a range from 7.0 g/cm$^3$ to 7.6 g/cm$^3$. An entire inner peripheral surface 8a of the bearing sleeve 8 (in other words, entire region in the axial direction between an inner peripheral chamfer 8e at an upper end of the bearing sleeve 8 and an inner peripheral chamfer 8f at a lower end thereof) is formed of a smooth cylindrical surface. In other words, the inner peripheral surface 8a of the bearing sleeve 8 does not have the radial dynamic pressure generating portions or the relief portion, and hence is a cylindrical surface having a uniform diameter. The inner peripheral surface 8a having a shape of the cylindrical surface faces, in the radial direction, the radial bearing surfaces A1 and A2 and the relief portion 2a2 of the outer peripheral surface 2a1 of the shaft portion 2a.

The bearing sleeve 8 has a lower end surface 8b, and the entire lower end surface 8b (in other words, entire region in the radial direction between the inner peripheral chamfer 8f and an outer peripheral chamfer 8g at the lower end of the bearing sleeve 8) is formed of an even and smooth flat surface that does not have the thrust dynamic pressure generating portion or the like. The lower end surface 8b faces the upper end surface 2b1 of the flange portion 2b in the axial direction. Note that, the inner peripheral surface 8a of the bearing sleeve 8 functions as a radial bearing surface that faces the radial bearing gaps, and the lower end surface 8b of the bearing sleeve 8 functions as a thrust bearing surface that faces a first thrust bearing gap. Thus, the inner peripheral surface 8a and the lower end surface 8b of the bearing sleeve 8 need to be increased in surface accuracy, and in addition, a perpendicularity between those surfaces needs to be increased. Specifically, the perpendicularity between the inner peripheral surface 8a and the lower end surface 8b is preferably set to 3 μm or less. Further, when surface porosities of the inner peripheral surface 8a and the lower end surface 8b of the bearing sleeve 8 are high, a lubricating oil in the radial bearing gaps and the first thrust bearing gap may be released into an inside of the bearing sleeve 8 through surface pores thereof, and pressures of oil films may not be sufficiently increased. As a countermeasure, the surface porosities of the inner peripheral surface 8a and the lower end surface 8b are preferably set, for example, to 10% or less.

The bearing sleeve 8 has an upper end surface 8c provided with an annular groove 8c1 along a radial intermediate portion, and radial grooves 8c2 for communicating the annular groove 8c1 and the inner peripheral chamfer 8e to each other. The number of the radial grooves 8c2 is arbitrary, and for example, three radial grooves 8c2 are equiangularly arranged. Note that, the annular groove 8c1 and the radial grooves 8c2 may be omitted so as to form the entire upper end surface 8c into an even and smooth flat surface. The bearing sleeve 8 has an outer peripheral surface 8d provided with an axial groove 8d1 formed over an entire axial length. The number of the axial grooves 8d1 is arbitrary, and for example, three axial grooves 8d1 are equiangularly arranged. Note that, the axial grooves 8d1 may be omitted so as to form the entire outer peripheral surface 8d into an even and smooth cylindrical surface.

The bearing sleeve 8 is manufactured by performing sizing on a sintered metal preform obtained by sintering a green compact of metal powder. As described above, the bearing sleeve 8 does not have the dynamic pressure generating portions, and hence a step of forming the dynamic pressure generating portions can be omitted. As a result, die cost can be markedly reduced. Further, the inner peripheral surface 8a and the lower end surface 8b of the bearing sleeve 8 are each formed into a simple shape, specifically, respectively into the smooth cylindrical surface and the smooth flat surface. With this, dimensional accuracies of those surfaces can be enhanced. In particular, in order to form the dynamic pressure generating portions through the sizing step, high pressure needs to be applied to the sintered metal preform. As a result, a larger area needs to be processed, and hence variation of the dimensional accuracy of the bearing sleeve 8 after the sizing becomes larger. However, when the dynamic pressure generating portions are not provided to the bearing sleeve 8 as described above, the pressure applied to the sintered metal preform in the sizing step can be reduced, and hence the variation of the dimensional accuracy of the bearing sleeve 8 can be reduced.

The side portion 7a of the housing 7 has a cylindrical shape. An inner peripheral surface of the side portion 7a is fixed to the bearing sleeve 8. The bottom portion 7b of the housing closes a lower end of the side portion 7a. In this embodiment, the side portion 7a is formed by a trimming process on a metal material, and the bottom portion 7b is formed by press-molding of a metal material.

The outer peripheral surface 8d of the bearing sleeve 8 is fixed to an inner peripheral surface 7a1 of the side portion 7a of the housing 7 by bonding or press-fitting. The inner peripheral surface 7a1 of the side portion 7a comprises a lower end provided with a fixing surface 7a2 radially larger than other regions. The side portion 7a comprises an upper end provided integrally with the sealing portion 9 projected radially inward. The inner peripheral surface 9a of the sealing portion 9 is formed into a tapered surface gradually reduced downward in diameter, and the sealing space S gradually reduced downward in radial dimension is formed between the inner peripheral surface 9a and the cylindrical surface 2a3 of the shaft portion 2a. The sealing space S exerts a capillary force of drawing-in the lubricating oil downward, to thereby prevent leakage of the lubricating oil to an outside. An oil level of the lubricating oil filled in an internal space of the housing 7 is constantly maintained within a range of the sealing space S. In other words, the sealing space S has a volume sufficient for absorbing a volumetric change amount generated along with a temperature change of the lubricating oil.

The bottom portion 7b of the housing 7 is fixed to the fixing surface 7a2 of the side portion 7a by press-fitting, bonding, or a combination thereof. The bottom portion 7b has an upper end surface 7b1 that faces, in the axial direction, the second thrust dynamic pressure generating portion provided to the lower end surface 2b2 of the flange portion 2b of the shaft member 2, and at least a region that faces the second thrust dynamic pressure generating portion (thrust bearing surface) is formed of a flat surface. In the example of the figure, the upper end surface 7b1 of the bottom portion 7b is provided with a thrust bearing surface 7b11 formed of an annular flat surface, and a flat relief portion 7b12 provided on a radially inner side thereof and recessed with respect to the thrust bearing surface 7b11.

After assembly of the members described above, the internal space of the housing 7 comprising internal pores of the bearing sleeve 8 and the flange portion 2b is filled with the lubricating oil. In this way, the fluid dynamic bearing device 1 illustrated in FIG. 2 is completed. At this time, the oil level is maintained within the sealing space S. Note that, when the inside of the housing 7 is filled with a large amount of oil, the volumetric change amount generated along with the temperature change of the lubricating oil becomes larger. Thus, the sealing space S needs to be enlarged, which leads to enlargement of the fluid dynamic bearing device 1. Therefore, it is preferred that the inside of the housing 7 be filled with a small amount of oil. In the fluid dynamic bearing device 1 according to this invention, the bearing sleeve 8 does not have the dynamic pressure generating portions as described above. Thus, it is unnecessary to reduce the density of the sintered metal in consideration of formability of the dynamic pressure generating portions, and the density of the sintered metal of the bearing sleeve 8 can be increased to be higher than that of a conventional bearing sleeve with dynamic pressure generating grooves (for example, 7.0 g/cm$^3$ or more, preferably, 7.2 g/cm$^3$ or more). With this, the sealing space S can be downsized in accordance with reduction in amount of the oil impregnated in the inside of the bearing sleeve 8. In addition, abrasion resistance of the bearing sleeve 8 can be enhanced, and a rigidity of the bearing sleeve 8 itself can be enhanced. Meanwhile, the flange portion 2b is provided with the dynamic pressure generating grooves as the first and second dynamic pressure generating portions, and hence it is preferred that the density of the sintered metal be increased as much as possible within a range in which the dynamic pressure generating grooves can be formed.

When the shaft member 2 is rotated, the radial bearing gaps are formed between the inner peripheral surface 8a of the bearing sleeve 8 and the radial bearing surfaces A1 and A2 of the shaft portion 2a, and the dynamic pressure generating grooves G1 and G2 increase pressure of the lubricating oil filled in the radial bearing gaps. By the pressure (dynamic pressure action), there are formed radial bearing portions R1 and R2 for rotatably supporting the shaft member 2 in a non-contact manner in the radial direction.

Simultaneously, the first thrust bearing gap is formed between the upper end surface 2b1 of the flange portion 2b and the lower end surface 8b of the bearing sleeve 8, and a second thrust bearing gap is formed between the lower end surface 2b2 of the flange portion 2b and the upper end surface 7b1 of the bottom portion 7b of the housing 7. The dynamic pressure generating grooves of the upper end surface 2b1 and the lower end surface 2b2 of the flange portion 2b increase the pressure of the lubricating oil filled in the thrust bearing gaps. By the pressures (dynamic pressure actions), there are formed thrust bearing portions T1 and T2 for rotatably supporting the shaft member 2 in a non-contact manner in both thrust directions.

At this time, the axial grooves 8d1 of the outer peripheral surface 8d, the radial grooves 8c2 of the upper end surface 8c, and the like of the bearing sleeve 8 communicate a space on a radially outer side with respect to the flange portion 2b and the sealing space S to each other. As a result, generation of negative pressure in the space on the radially outer side with respect to the flange portion 2b can be prevented. In particular, in this embodiment, as illustrated in FIG. 2, the dynamic pressure generating grooves G1 of the radial bearing surface A1 formed on the upper side on the outer peripheral surface 2a1 of the shaft portion 2a are formed into an axially asymmetrical shape, and hence the lubricating oil in the radial bearing gaps are forced downward along with rotation of the shaft member 2. With this, the lubricating oil circulates through a path formed of the radial bearing gaps (R1 and R2), the first thrust bearing gap (T1), the axial grooves 8d1, and the radial grooves 8c2, and hence local generation of negative pressure can be reliably prevented.

As described above, when the entire inner peripheral surface 8a of the bearing sleeve 8 is formed of a smooth cylindrical surface, the inner peripheral surface 8a is formed with high accuracy. Further, the dynamic pressure generating grooves G1 and G2 formed in the radial bearing surfaces A1 and A2 of the outer peripheral surface 2a1 of the shaft portion 2a are formed with high accuracy by the rolling process on the shaft preform after the quenching. Therefore, the radial bearing gaps formed between the inner peripheral surface 8a of the bearing sleeve 8 and the radial bearing surfaces A1 and A2 of the outer peripheral surface 2a1 of the shaft portion 2a can be set with high accuracy. As a result, a bearing rigidity can be enhanced. In addition, a size of the radial bearing gap of the radial bearing portion R1 on the upper side and a size of the radial bearing gap of the radial bearing portion R2 on the lower side can be set to be equal to each other. Thus, the lubricating oil is less liable to circulate in an undesired direction (in the example of the figure, fluid circulation upward through the radial bearing gaps). As a result, an imbalance amount of the dynamic pressure generating grooves G1 for forcibly circulating the lubricating oil can be reduced. Specifically, inclined grooves on the upper side of the dynamic pressure generating grooves G1 can be shortened. With this, the dynamic pressure generating grooves G1 can be shifted upward by an amount of shortening the inclined grooves on the upper side of the dynamic pressure generating grooves G1. As a result, an axial interval (bearing span) between the radial bearing surfaces A1 and A2 can be enlarged, and the bearing rigidity can be further enhanced. Alternatively, by the amount of shortening the inclined grooves on the upper side of the dynamic pressure generating grooves G1, the fluid dynamic bearing device 1 can be reduced in axial dimension and downsized.

This invention is not limited to the above-mentioned embodiment. Now, description is made of other embodiments of this invention. Parts having the same functions as those in the above-mentioned embodiment are denoted by the same reference symbols, and redundant description thereof is omitted.

Figure 3:
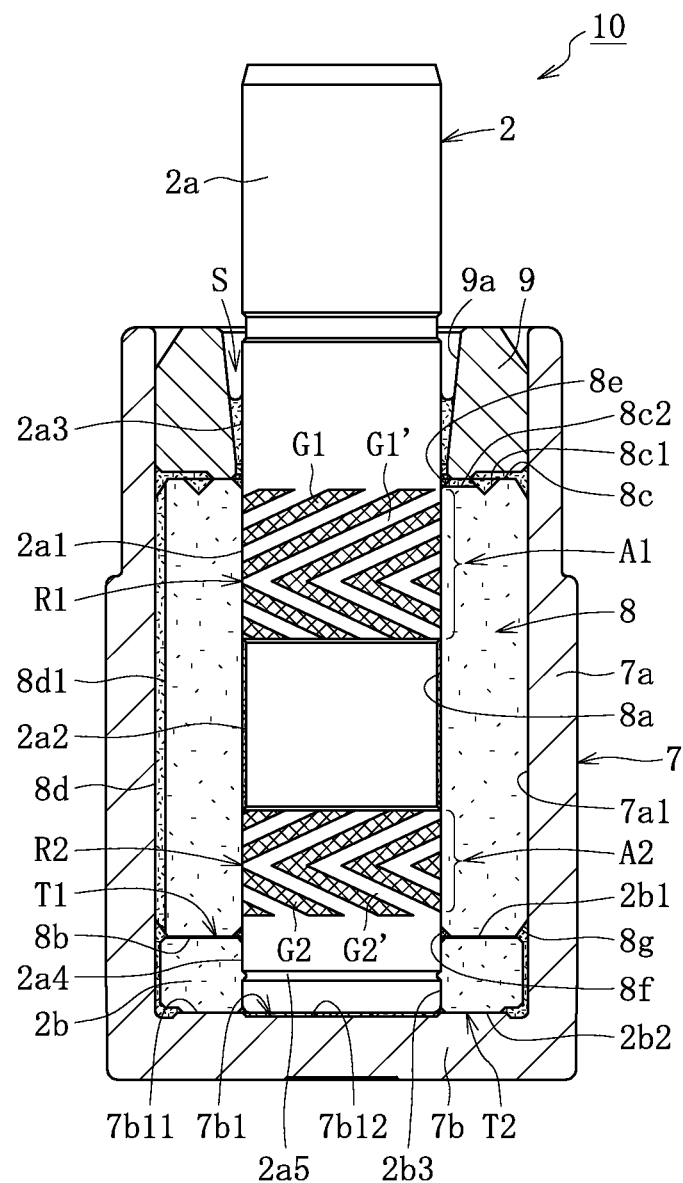
FIG. 3 is a sectional view of a fluid dynamic bearing device according to another embodiment of the first invention of the present application.

A fluid dynamic bearing device 10 illustrated in FIG. 3 is different from the fluid dynamic bearing device 1 of the embodiment described above in that the side portion 7a of the housing 7 and the sealing portion 9 are formed separately from each other and the side portion 7a and the bottom portion 7b of the housing 7 are integrally made of a resin. The sealing portion 9 is obtained by forming a metal material or a resin material into an annular shape, and fixed to the inner peripheral surface 7a1 of the side portion 7a of the housing 7 by bonding, press-fitting, or the like. As in the embodiment described above, the housing 7 does not have dynamic pressure generating grooves, and hence groove patterns are not provided to a die set for forming the housing 7. Thus, resin materials for the housing 7 need not be highly fluidic enough to propagate to minute parts of the groove patterns having an ultrafine shape, and hence can be selected based, for example, on strength rather than the fluidity.

Figure 4:
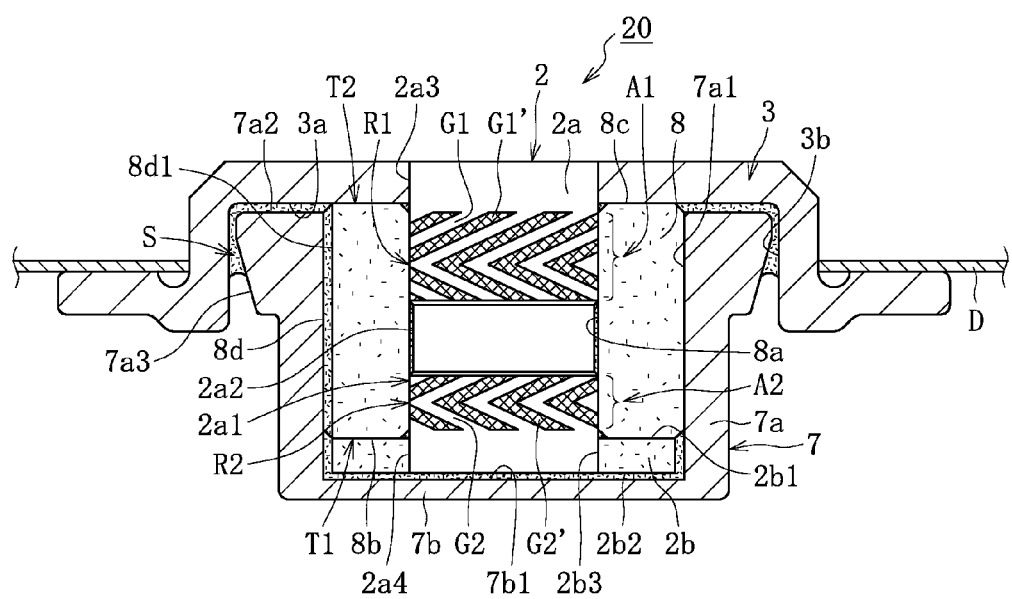
FIG. 4 is a sectional view of a fluid dynamic bearing device according to still another embodiment of the first invention of the present application.

In a fluid dynamic bearing device 20 illustrated in FIG. 4, the lower end surface 2b2 of the flange portion 2b is formed of a flat surface that does not have a dynamic pressure generating portion, and the disk hub 3 has a lower end surface 3a provided with a thrust dynamic pressure generating portion (not shown). When the shaft member 2 is rotated, the second thrust bearing gap is formed between the lower end surface 3a of the disk hub 3 and the upper end surface 8c of the bearing sleeve 8, and the thrust dynamic pressure generating portion provided to the disk hub 3 increases pressure of the lubricating oil in the second thrust bearing gap. In this way, a thrust bearing portion T2 is formed. Further, the housing 7 has an outer peripheral surface provided with a tapered surface 7a3 gradually reduced downward in diameter, and the sealing space S is formed between the tapered surface 7a3 and a cylindrical inner peripheral surface 3b of the disk hub 3.

Further, in the embodiments described above, the dynamic pressure generating grooves G1 and G2 arrayed in a herringbone pattern are illustrated as the radial dynamic pressure generating portions formed on the outer peripheral surface 2a1 of the shaft portion 2a. However, this invention is not limited thereto, and the radial dynamic pressure generating portions may comprise, for example, dynamic pressure generating grooves arrayed in a spiral pattern, axial grooves, or multi-circular-arc surfaces.

Still further, in the case illustrated in the embodiments described above, a region of the dynamic pressure generating grooves of the radial bearing surface A1 on the upper side is formed into an axially asymmetrical shape so as to forcibly circulate the lubricating oil in the radial bearing gaps. However, when such forcible circulation is unnecessary, the region of the dynamic pressure generating grooves of the radial bearing surface A1 on the upper side may be formed into an axially symmetrical shape.

Yet further, in the case illustrated in the embodiments described above, the radial bearing surfaces A1 and A2 are formed on the outer peripheral 2a1 of the shaft portion 2a at the two positions spaced apart from each other in the axial direction. However, this invention is not limited thereto, and the radial bearing surface may be formed only at one position, or the radial bearing surfaces A1 and A2 provided at the two positions may be formed adjacent to each other in the axial direction.

Yet further, in the embodiments described above, the dynamic pressure generating grooves arrayed in a spiral pattern are illustrated as the thrust dynamic pressure generating portions provided to the flange portion 2b. However, this invention is not limited thereto, and dynamic pressure generating grooves arrayed, for example, in a herringbone pattern may be employed.

Yet further, in the case illustrated in the embodiments described above, the lubricating oil is used as a lubricating fluid. However, this invention is not limited thereto, and other fluids such as a magnetic fluid and air may be used.

Yet further, in the embodiments described above, the shaft member 2 is rotated. However, this invention is not limited thereto, and there may be employed a shaft fixed type in which the shaft member 2 is fixed and the bearing sleeve 8 side is rotated.

Now, description is made of embodiments of a second invention of the present application with reference to FIGS. 5 to 13.

Figure 5:
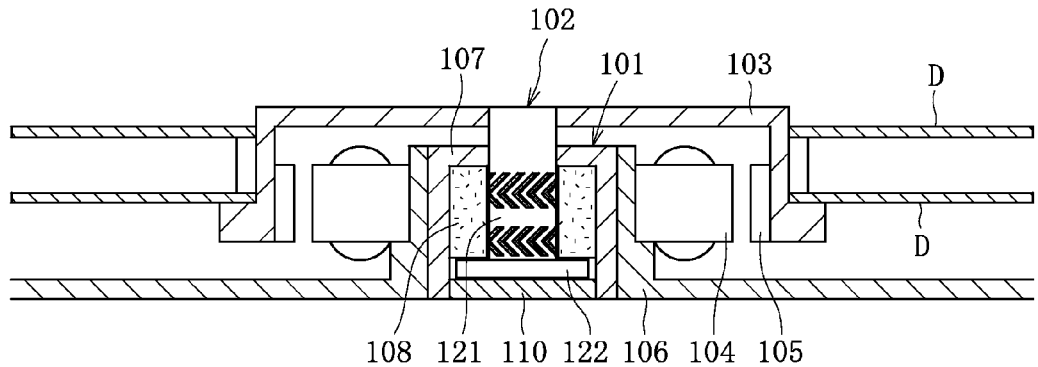
FIG. 5 is a sectional view conceptually illustrating an example of a spindle motor for an information apparatus incorporating a fluid dynamic bearing device.

FIG. 5 conceptually illustrates a structural example of a spindle motor for information apparatus, which incorporates a fluid dynamic bearing device. This spindle motor is used for a disk drive device for HDDs and the like, and comprises a fluid dynamic bearing device 101 for rotatably supporting a shaft member 102, a disk hub 103 fixed to the shaft member 102, stator coils 104 and a rotor magnet 105 facing each other across, for example, a radial gap, and a motor base 106. The stator coils 104 are fixed to an outer periphery of the motor base 106, and the rotor magnet 105 is fixed to an inner periphery of the disk hub 103. The fluid dynamic bearing device 101 comprises a bearing member 109 fixed to the inner periphery of the motor base 106. The disk hub 103 holds one or a plurality of disks D (two in the example of the figure), and the disks D are clamped and fixed in the axial direction by a clamper (not shown) and the disk hub 103 that are screwed to the shaft member 102. In the structure described above, when the stator coils 104 are energized, the rotor magnet 105 is rotated by an electromagnetic force generated between the stator coils 104 and the rotor magnet 105. With this, the disk hub 103 and the disks D held by the disk hub 103 are rotated integrally with the shaft member 102.

Figure 6:
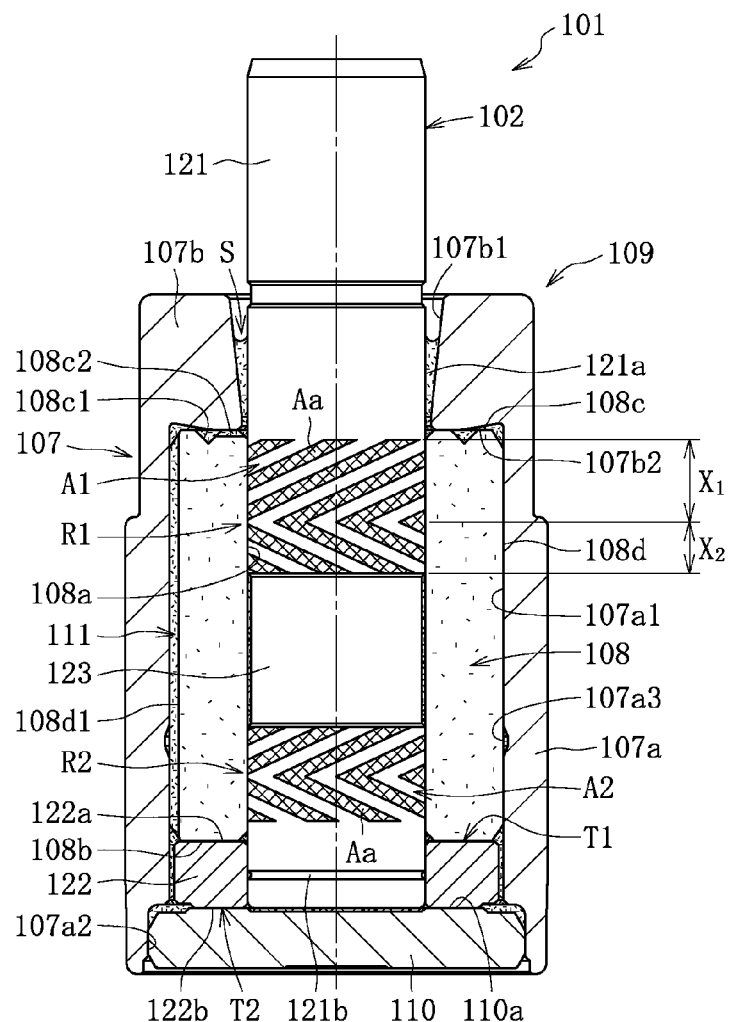
FIG. 6 is an axial sectional view of the fluid dynamic bearing device according to a first embodiment of a second invention of the present application.

FIG. 6 illustrates the fluid dynamic bearing device 101 according to a first embodiment of this invention. The fluid dynamic bearing device 101 comprises, as components, the bearing member 109 opened at both axial end portions, the shaft member 102 inserted along an inner periphery of the bearing member 109, and a lid member 110 for closing an opening of one of the end portions of the bearing member 109. A lubricating oil as a lubricating fluid (indicated by densely dotted hatching) is filled in an internal space. In this embodiment, the bearing member 109 comprises a bearing sleeve 108 having an inner periphery along which the shaft member 102 is inserted, and a housing 107 having an inner periphery on which the bearing sleeve 108 is held (fixed). Note that, for the sake of convenience in description, a side on which the lid member 110 is hereinafter provided is referred to as a lower side, and an opposite side thereto in the axial direction is hereinafter referred to as an upper side.

The bearing sleeve 108 is obtained by forming a porous body made of a sintered metal, for example, a porous body made of a sintered metal containing copper or iron as a main component into a cylindrical shape. The bearing sleeve 108 may be formed of a porous body other than that made of the sintered metal, such as a porous resin and ceramics, or may be made of a solid (non-porous) metal material such as brass or stainless steel. The bearing sleeve 108 has an inner peripheral surface 108a formed into an even and smooth cylindrical surface, and the bearing sleeve 108 has an outer peripheral surface 108d formed into an even and smooth cylindrical surface except that an axial groove 108d1 is provided at one or a plurality of positions in a circumferential direction. The bearing sleeve 108 has a lower end surface 108b formed into an even and smooth flat surface, and an upper end surface 108c provided with an annular groove 108c1 and radial grooves 108c2 each having a radially outer end communicated to the annular groove 108c1.

The lid member 110 is obtained by forming a metal material into a plate shape. Although detailed description is given later, the lid member 110 has an upper end surface 110a having an annular region that forms a thrust bearing gap of a second thrust bearing portion T2 between the upper end surface 110a and a lower end surface 122b of a flange portion 122 of the shaft member 102. The annular region is formed into a smooth and flat surface, and does not have recessed portions such as dynamic pressure generating grooves for generating a dynamic pressure action in the lubricating oil interposed in the thrust bearing gap.

The housing 107 is obtained by forming an ingot material (for example, solid metal material of brass, stainless steel, and the like) into a substantially cylindrical shape opened at both axial end portions, and integrally comprises a main body portion 107a having an inner periphery along which the bearing sleeve 108 and the lid member 110 are held, and a sealing portion 107b extending to a radially inner side from an upper end of the main body portion 107a. The main body portion 107a has an inner peripheral surface comprising a small diameter inner peripheral surface 107a1 having a relatively small diameter, and a large diameter inner peripheral surface 107a2 having a relatively large diameter. The bearing sleeve 108 and the lid member 110 are fixed respectively to the small diameter inner peripheral surface 107a1 and the large diameter inner peripheral surface 107a2. Fixing means for the bearing sleeve 108 and the lid member 110 with respect to the housing 107 is not particularly limited, and appropriate fixing means such as press-fitting, bonding, press-fit bonding, and welding may be employed. In this embodiment, the bearing sleeve 108 is fixed to the inner periphery of the housing 107 by what is called gap-filling bonding performed by loosely fitting the bearing sleeve 108 to the small diameter inner peripheral surface 107a1 of the main body portion 107a and interposing an adhesive in a gap therebetween. At predetermined positions in the axial direction on the small diameter inner peripheral surface 107a1, annular grooves 107a3 that function as adhesive pools are formed. When the adhesive is filled in the annular grooves 107a3 and is cured, a bonding strength of the bearing sleeve 108 with respect to the housing 107 is enhanced.

An inner peripheral surface 107b1 of the sealing portion 107b is formed into a tapered surface gradually reduced downward in diameter, and a wedge-like sealing space S gradually reduced downward in radial dimension is formed between the inner peripheral surface 107b1 and an opposing outer peripheral surface 121a of the shaft member 102 (shaft portion 121). The upper end surface 108c of the bearing sleeve 108 is held in abutment against (a radially inner region of) a lower end surface 107b2 of the sealing portion 107b. With this, the bearing sleeve 108 is positioned relative to the housing 107 in the axial direction. A radially outer region of the lower end surface 107b2 of the sealing portion 107b gradually recedes upward toward the radially outer side so as to form an annular gap between the lower end surface 107b2 and the upper end surface 108c of the bearing sleeve 108. A radially inner rim portion of the annular gap is communicated to the annular groove 108c1 of the upper end surface 108c of the bearing sleeve 108.

The housing 107 structured as described above may be obtained by injection molding of a resin. In this case, the housing 107 may be formed by injection molding of a resin together with the bearing sleeve 108 as an insert component. Alternatively, the housing 107 may be obtained by injection molding of low-melting point metals typified by a magnesium alloy, an aluminum alloy, and the like, or may comprise a product of what is called MIM.

The shaft portion 121 of the shaft member 102 is obtained by forming quenched stainless steel (such as SUS420J2) into a solid shaft shape, and the flange portion 122 thereof projects from a lower end of the shaft portion 121 to the radially outer side. The flange portion 122 is obtained by forming, for example, stainless steel of the same type as that for the shaft portion 121 or a porous body made of a sintered metal into an annular shape, and fixed to an outer periphery of the lower end of the shaft portion 121 by appropriate means such as press-fitting, bonding, press-fit bonding, and welding. On the outer peripheral surface 121a of the shaft portion 121, an annular groove 121b is provided in a region in which the flange portion 122 is fixed. When the flange portion 122 is fixed to the shaft portion 121 with, for example, an adhesive, the annular groove 121b functions as an adhesive pool. Thus, a fixing strength of the flange portion 122 with respect to the shaft portion 121 is enhanced. Further, a projecting portion formed on an inner peripheral surface of the flange portion 122 is fitted to the annular groove 121b, and hence it is also possible to enhance pull-out resistance of the flange portion 122.

On the outer peripheral surface 121a of the shaft portion 121, cylindrical regions that serve as the radial bearing surfaces A1 and A2 for forming the radial bearing gaps between the outer peripheral surface 121a and the opposing inner peripheral surface 108a of the bearing sleeve 108 are formed at two positions spaced apart from each other in the axial direction. The radial bearing surfaces A1 and A2 are each circumferentially provided with a plurality of dynamic pressure generating grooves Aa (indicated by cross-hatching in FIG. 6) as recessed portions for generating a dynamic pressure action in the lubricating oil interposed in the radial bearing gaps. Here, the plurality of dynamic pressure generating grooves Aa are arrayed in a herringbone pattern. In this embodiment, the dynamic pressure generating grooves Aa provided to the radial bearing surface A1 on the upper side are formed into an axially asymmetrical shape with respect to an axial center m (axial center between upper and lower inclined groove regions), and an axial dimension X1 of the upper region with respect to the axial center m is larger than an axial dimension X2 of the lower region. Meanwhile, the dynamic pressure generating grooves Aa provided to the radial bearing surface A2 on the lower side are formed into an axially symmetrical shape. A groove depth of each of the dynamic pressure generating grooves Aa is set to approximately several micrometers.

On the outer peripheral surface 121a of the shaft portion 121, at a position between the two radial bearing surfaces A1 and A2, there is provided a cylindrical middle relief portion 123 that recedes to the radially inner side with respect to bottom portions of the dynamic pressure generating grooves Aa (formed to have a smaller diameter). When the middle relief portion 123 is provided to the outer peripheral surface 121a of the shaft portion 121, a cylindrical lubricating oil pool is formed between the outer peripheral surface 121a of the shaft portion 121 and the inner peripheral surface 108a of the bearing sleeve 108 formed into a cylindrical surface having a uniform diameter. With this, during operation of the bearing, the two radial bearing gaps adjacent to the lubricating oil pool in the axial direction can be constantly filled with an ample amount of the lubricating oil. Thus, rotational accuracy in the radial direction is stabilized.

Figure 7A:
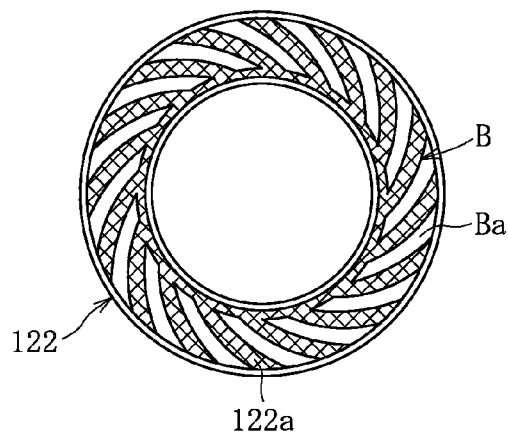
FIG. 7a is a view of an upper end surface of a flange portion.
Figure 7B:
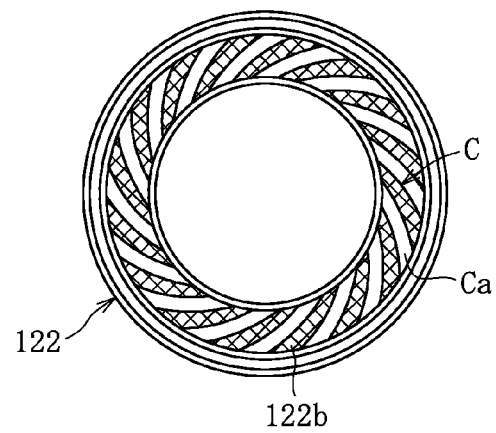
FIG. 7b is a view of a lower end surface of the flange portion.

As illustrated in FIG. 7(a), the flange portion 122 has an upper end surface 122a provided with a thrust bearing surface B for forming a thrust bearing gap of a first thrust bearing portion T1 between the upper end surface 122a and the opposing lower end surface 108b of the bearing sleeve 108. The thrust bearing surface B is circumferentially provided with a plurality of dynamic pressure generating grooves Ba as recessed portions for generating a dynamic pressure action in the lubricating oil interposed in the thrust bearing gap of the first thrust bearing portion T1. Here, the dynamic pressure generating grooves Ba are arrayed in a spiral pattern. Further, as illustrated in FIG. 7(b), the lower end surface 122b of the flange portion 122 is provided with a thrust bearing surface C for forming a thrust bearing gap of the second thrust bearing portion T2 between the lower end surface 122b and the opposing upper end surface 110a of the lid member 110. The thrust bearing surface C is circumferentially provided with a plurality of dynamic pressure generating grooves Ca as recessed portions for generating a dynamic pressure action in the lubricating oil interposed in the thrust bearing gap of the second thrust bearing portion T2. Here, the dynamic pressure generating grooves Ca are arrayed in a spiral pattern. Any one or both of the dynamic pressure generating grooves Ba and Ca may be arrayed in a herringbone pattern.

Figure 8:
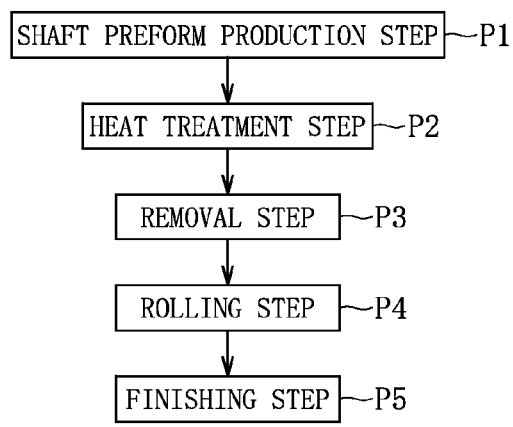
FIG. 8 is a block diagram illustrating a manufacturing step of a shaft portion of a shaft member.

The shaft member 102 structured as described above is completed by fixing the flange portion 122 produced in a separate flow to the lower end of the shaft portion 121 produced by a shaft preform production step P1, a heat treatment step P2, a removal step P3, a rolling step P4, and a finishing step P5 performed in the stated order as illustrated in FIG. 8. Now, detailed description is made of the steps of producing the shaft portion 121.

(1) Shaft Preform Production Step P1

In the shaft preform production step P1, a predetermined process is performed on a short bar material obtained by cutting a long bar material into a predetermined length so as to obtain a shaft preform that is finished into a shape substantially in conformity with the shape of the shaft portion 121 as a finished product except a part corresponding to the dynamic pressure generating grooves Aa. In detail, for example, a lathing process is performed on the short bar material so as to form the middle relief portion 123 and the annular groove 121b in the outer peripheral surface, and a tapping process is performed on one end of the bar material so as to obtain a shaft preform provided with a threaded hole (provided to screw the clamper; not shown) opened at one end surface. Note that, a schematic shape of the shaft preform may be obtained not only by a machining process such as the lathing but also by plastic working such as forging.

(2) Heat Treatment Step P2

Figure 9A:
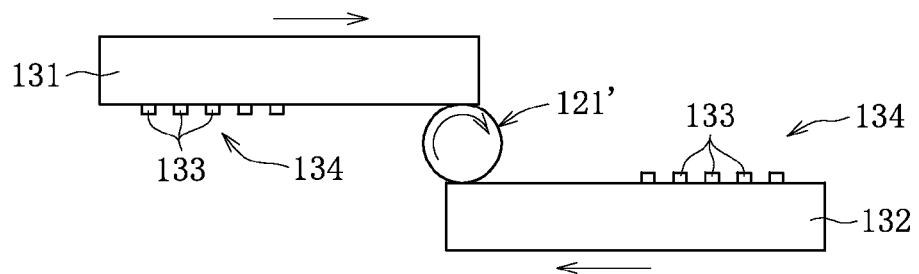
FIG. 9a is a front view schematically illustrating a rolling step, specifically, illustrating a state immediately after a start of rolling.

In the heat treatment step P2, heat treatment is performed at least on the outer peripheral surface of the shaft preform obtained by the shaft preform production step P1 so as to obtain a quenched shaft 121' having a hardened surface layer having a hardness of HV 450 or more, more preferably, HV 500 or more (refer to FIG. 9(a)). A heat treatment method is not particularly limited, and quenching such as induction hardening, vacuum hardening, carburizing-and-quenching, and carbonitriding-and-quenching, tempering after the quenching, and the like may be employed in appropriate combination. The heat treatment need not necessarily be performed to increase a hardness of (to quench) the entire shaft preform as long as the hardened surface layer is formed to have a thickness larger than the groove depth of each of the dynamic pressure generating grooves Aa to be formed.

(3) Removal Step P3

In the removal step P3, along with formation of the quenched shaft 121' (hardened surface layer) by performing the heat treatment on the shaft preform, a surface oxide film formed on a surface of the quenched shaft 121', which is also referred to as black scale, is removed. The black scale (surface oxide film) is removed, for example, by performing centerless grinding on the quenched shaft 121'.

(4) Rolling Step P4

Figure 9B:
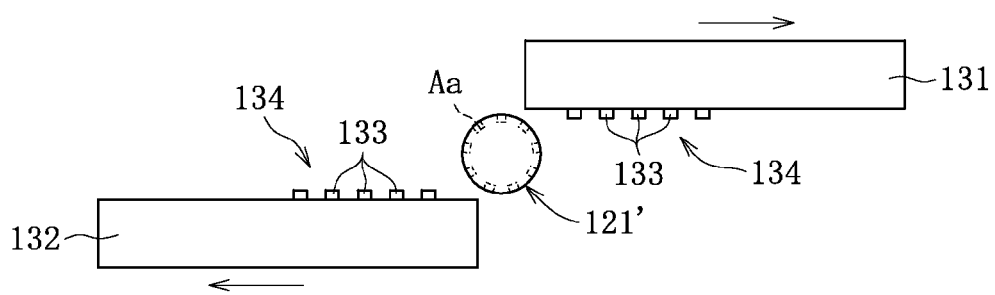
FIG. 9b is another front view schematically illustrating the rolling step, specifically, illustrating a state after completion of the rolling.
Figure 10:
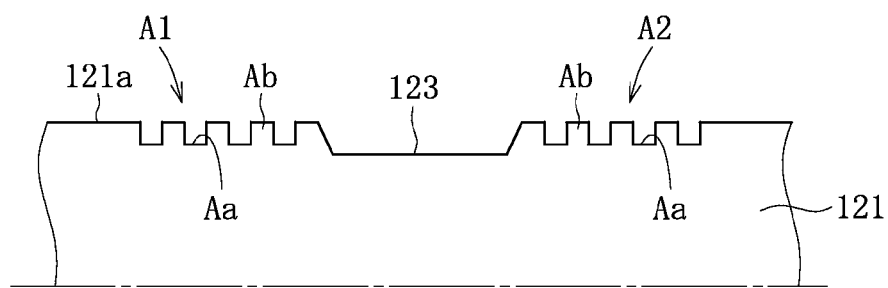
FIG. 10 is a view conceptually illustrating a main part of the shaft portion after a finishing step.

In the rolling step P4, a rolling process is performed on the hardened surface layer of the quenched shaft 121' (in which the black scale is removed from the surface thereof) so as to form the dynamic pressure generating grooves Aa in the outer peripheral surface of the quenched shaft 121'. In this embodiment, as illustrated in FIGS. 9(a) and 9(b), by using a pair of rolling dies 131 and 132 provided to be relatively slidable, the dynamic pressure generating grooves Aa as the recessed portions are formed by rolling in the outer peripheral surface of the quenched shaft 121'. A surface opposed to a counterpart of each of the rolling dies 131 and 132 is provided with a dynamic pressure generating groove forming portion 134 as a recessed portion forming portion. The dynamic pressure generating groove forming portion 134 comprises projecting portions 133 formed in conformity with a shape of each of the dynamic pressure generating grooves Aa and arrayed in a herringbone pattern. Here, considering that the outer peripheral surface of the quenched shaft 121' is ground, in the finishing step P5 described below, by a predetermined amount together with projection-like hill portions that define the dynamic pressure generating grooves Aa, a height dimension of the projecting portions 133 is set to be larger by a predetermined amount than the required groove depth of the dynamic pressure generating grooves Aa. Further, in the rolling dies 131 and 132, a hardness of at least the dynamic pressure generating groove forming portion 134 (plurality of projecting portions 133) is set to be HV 100 or more higher than that of the hardened surface layer of the quenched shaft 121'.

Then, as illustrated in FIG. 9(a), after the quenched shaft 121' is introduced to between the rolling dies 131 and 132, the rolling dies 131 and 132 are moved relative to each other so as to press the dynamic pressure generating groove forming portion 134 of each of the rolling dies 131 and 132 onto the outer peripheral surface of the quenched shaft 121'. With this, as illustrated in FIG. 9(b), deformable parts of the outer peripheral surface of the quenched shaft 121', onto which the projecting portions 133 of the dynamic pressure generating groove forming portion 134 are pressed, are subjected to plastic flow to be extruded therearound. In this way, the hill portions that define the dynamic pressure generating grooves Aa are formed, and simultaneously, the dynamic pressure generating grooves Aa are formed. Note that, in this embodiment, as described above, the height dimension of the projecting portions 133 forming the dynamic pressure generating groove forming portion 134 is set to be larger than the required groove depth of the dynamic pressure generating grooves Aa. Thus, the groove depth of the dynamic pressure generating grooves Aa at this phase is larger than the groove depth of the dynamic pressure generating grooves Aa provided to the outer peripheral surface of the shaft portion 121 (shaft member 102) as a finished product.

Note that, the projecting portions 133 (dynamic pressure generating groove forming portions 134) for forming the dynamic pressure generating grooves Aa in the outer peripheral surface of the quenched shaft 121' may be provided to only one of the rolling dies 131 and 132.

(5) Finishing Step P5

In the finishing step P5, the outer peripheral surface of the quenched shaft 121', in which the dynamic pressure generating grooves Aa have been formed by rolling in the rolling step P4, is finished to have predetermined accuracy. Specifically, on the outer peripheral surface of the quenched shaft 121', grinding, polishing, or plastic working is performed on cylindrical regions provided with the dynamic pressure generating grooves Aa through the rolling process (cylindrical regions of the shaft portion 121, which serve as the radial bearing surfaces A1 and A2) so as to finish projection-like hill portions Ab that define the dynamic pressure generating grooves Aa into a predetermined height and to obtain the dynamic pressure generating grooves Aa having a predetermined depth. Further, an axial region other than the axial regions that serve as the radial bearing surfaces A1 and A2, such as the middle relief portion 123, is also finished to have predetermined accuracy (for the above description, refer to FIG. 10). In this way, the shaft portion 121 as a finished product is obtained.

In the fluid dynamic bearing device 101 structured as described above, when the shaft member 102 is rotated, the radial bearing gaps are formed respectively between the radial bearing surfaces A1 and A2 of the shaft portion 121 and the opposing inner peripheral surface 108a of the bearing sleeve 108. Then, along with the rotation of the shaft member 102, pressures of oil films formed in both the radial bearing gaps are increased by the dynamic pressure actions of the dynamic pressure generating grooves Aa and Aa. As a result, the radial bearing portions R1 and R2 for supporting the shaft member 102 in a non-contact manner in the radial direction are formed at the two positions spaced apart from each other in the axial direction. Simultaneously, the first and second thrust bearing gaps are respectively formed between the thrust bearing surface B provided to the upper end surface 122a of the flange portion 122 and the opposing lower end surface 108b of the bearing sleeve 108, and between the thrust bearing surface C provided to the lower end surface 122b of the flange portion 122 and the opposing upper end surface 110a of the lid member 110. Then, along with the rotation of the shaft member 102, pressures of oil films formed in both the thrust bearing gaps are increased respectively by the dynamic pressure actions of the dynamic pressure generating grooves Ba and Ca. As a result, the first thrust bearing portion T1 and the second thrust bearing portion T2 for supporting the shaft member 102 in a non-contact manner in both the thrust directions are formed.

Further, the sealing space S has a wedge-like shape gradually reduced in radial dimension toward an inner side of the housing 107, and hence the lubricating oil in the sealing space S is drawn-in by a drawing-in action of the capillary force toward the inner side of the housing 107. Further, the sealing space S has a buffering function for absorbing the volumetric change amount generated along with the temperature change of the lubricating oil filled in the internal space of the housing 107, and the oil level of the lubricating oil is constantly maintained within the sealing space S within a range of expected temperature changes. Thus, leakage of the lubricating oil from the inside of the housing 107 to the outside is effectively prevented.

Further, as described above, with regard to the dynamic pressure generating grooves Aa on the upper side, the axial dimension X1 of the upper region with respect to the axial center m is set to be larger than the axial dimension X2 of the lower region. Thus, at the time of the rotation of the shaft member 102, a force of drawing-in the lubricating oil by the dynamic pressure generating grooves Aa is relatively greater in the upper region than in the lower region. Due to a pressure difference of the drawing-in force, the lubricating oil filled in the gap between the inner peripheral surface 108a of the bearing sleeve 108 and the outer peripheral surface 121a of the shaft portion 121 flows downward. Then, the lubricating oil circulates through a path formed of the thrust bearing gap of the first thrust bearing portion T1, an axial fluid passageway 111 formed of the axial groove 108d1 of the bearing sleeve 108, an annular space formed of an outer peripheral chamfer at an upper end of the bearing sleeve 108 and the like, and a fluid passageway formed of the annular groove 108c1 and the radial grooves 108c2 of the bearing sleeve 108. In this way, the lubricating oil is re-drawn into the radial bearing gap of the first radial bearing portion R1.

With such a structure, a pressure balance of the lubricating oil can be maintained. Simultaneously, problems such as generation of bubbles along with the local generation of the negative pressure, and the leakage of the lubricating oil and occurrence of vibration due to the generation of the bubbles can be solved. The sealing space S is communicated to the circulation path described above. Thus, even when the bubbles are mixed in the lubricating oil for some reasons, the bubbles are discharged to the outside air from an oil surface (air-liquid interface) of the lubricating oil in the sealing space S when the bubbles circulate along with the lubricating oil. As a result, adverse effects due to the bubbles are more effectively prevented.

As described above, the required groove depth of the dynamic pressure generating grooves Aa provided to the outer peripheral surface 121a of the shaft member 102 (shaft portion 121) is set in a micron order. Thus, the inventors of the present application have found that, even when the rolling process is performed on the quenched shaft 121' (hardened surface layer), the dynamic pressure generating grooves Aa can be formed to have a predetermined groove depth as long as a minimum necessary condition is satisfied. In addition, when the dynamic pressure generating grooves Aa as the recessed portions for generating a dynamic pressure are formed by performing the rolling process on the hardened surface layer of the quenched shaft 121', an amount of a thickness increase, which is caused by the rolling, is reduced on both sides of each of the projecting portions Ab (refer to FIG. 10) in comparison with a case of performing the rolling process on a shaft preform that has not yet been subjected to the heat treatment. As a result, the groove depths of the dynamic pressure generating grooves Aa are less liable to vary from each other immediately after the rolling. In addition, it is no longer necessary to perform the heat treatment on the shaft preform after the dynamic pressure generating grooves Aa are formed by rolling, in other words, under a state in which internal stress is accumulated in the shaft preform, and hence deformation due to distortion of the shaft preform is less liable to occur. Thus, even in the case where the finishing step P5 is provided to perform predetermined last finishing on the quenched shaft 121' in the finishing step P5 as in this embodiment, a processing amount thereof can be reduced.

Further, with the configuration of this invention, the removal process of removing the black scale formed on the external surface of the quenched shaft 121' can be performed prior to the rolling process. The outer peripheral surface of the quenched shaft 121' before the rolling process has a shape of a substantially smooth cylindrical surface that does not have fine projections and recesses (repetition of projections and recesses) such as the dynamic pressure generating grooves Aa and the hill portions Ab that define the dynamic pressure generating grooves Aa, and hence the black scale can be easily removed. Thus, the black scale is not left at the groove bottoms of the dynamic pressure generating grooves Aa formed in the outer peripheral surface 121a of the shaft portion 121, and hence the hardened surface layer is exposed. As a result, a problem of deterioration in bearing performance, which may be caused by contaminants derived from the black scale that has peeled off from the shaft portion 121 of the shaft member 102 during operation of the fluid dynamic bearing device 101, can be effectively prevented.

In addition, of the two surfaces that form the radial bearing gaps, the outer peripheral surface 121a of the shaft portion 121 is provided with the dynamic pressure generating grooves Aa, and the outer peripheral surface 121a of the shaft portion 121 is provided with the middle relief portion 123. Thus, the inner peripheral surface 108a of the bearing sleeve 108 (inner peripheral surface of the bearing member) is formed into an even and smooth cylindrical surface. Therefore, when the bearing sleeve 108 is manufactured by using a sintered metal, the manufacturing step is completed by performing a correction process (sizing) on an inner peripheral surface and an outer peripheral surface of a sintered compact obtained by sintering a molded green compact of raw material powder. Thus, a step of pressure-molding the recessed portions for generating a dynamic pressure in the inner peripheral surface need not be provided. In this way, shape simplification can be achieved, and hence cost of a die set can be reduced in accordance therewith. As a result, manufacturing cost of the bearing sleeve 108, by extension, the fluid dynamic bearing device 101 as a whole can be reduced.

In this way, according to this invention, the dynamic pressure generating grooves Aa can be formed with high accuracy in the outer peripheral surface of the shaft member 102 while saving time and effort to form, by rolling, the dynamic pressure generating grooves Aa as the recessed portions for generating a fluid dynamic pressure in the radial bearing gaps. In this way, cost of the fluid dynamic bearing device 101 capable of exerting desired bearing performance can be reduced.

As described above, the finishing step P5 of finishing the outer peripheral surface of the quenched shaft 121' to have predetermined accuracy is provided in the manufacturing process for obtaining the shaft portion 121 having the outer peripheral surface 121a provided with the dynamic pressure generating grooves Aa. However, with the configuration of this invention, the dynamic pressure generating grooves Aa can be formed with higher accuracy than in conventional methods, and hence the finishing step P5 need not necessarily be provided. Omission of the finishing step P5 contributes to further reduction in cost of the shaft member 102, by extension, the fluid dynamic bearing device 101.

Further, in the above description, the shaft portion 121 and the flange portion 122 of the shaft member 102 are provided separately from each other, and the flange portion 122 produced in another flow is fixed to the lower end of the shaft portion 121 having the outer peripheral surface 121a provided with the dynamic pressure generating grooves Aa, to thereby obtain the shaft member 102. However, by using a shaft preform integrally comprising a disk-like part to be formed into the flange portion 122, the shaft portion 121 and the flange portion 122 can be formed integrally with each other.

This invention is applicable not only to the embodiment described above. Now, with reference to the drawings, description is made of fluid dynamic bearing devices 101 according to other embodiments, to which this invention is applicable. In the other embodiments described below, for the sake of simplicity of description, substantially the same members and parts as those in the embodiment described above are denoted by the same reference symbols, and redundant description thereof is omitted.

Figure 11:
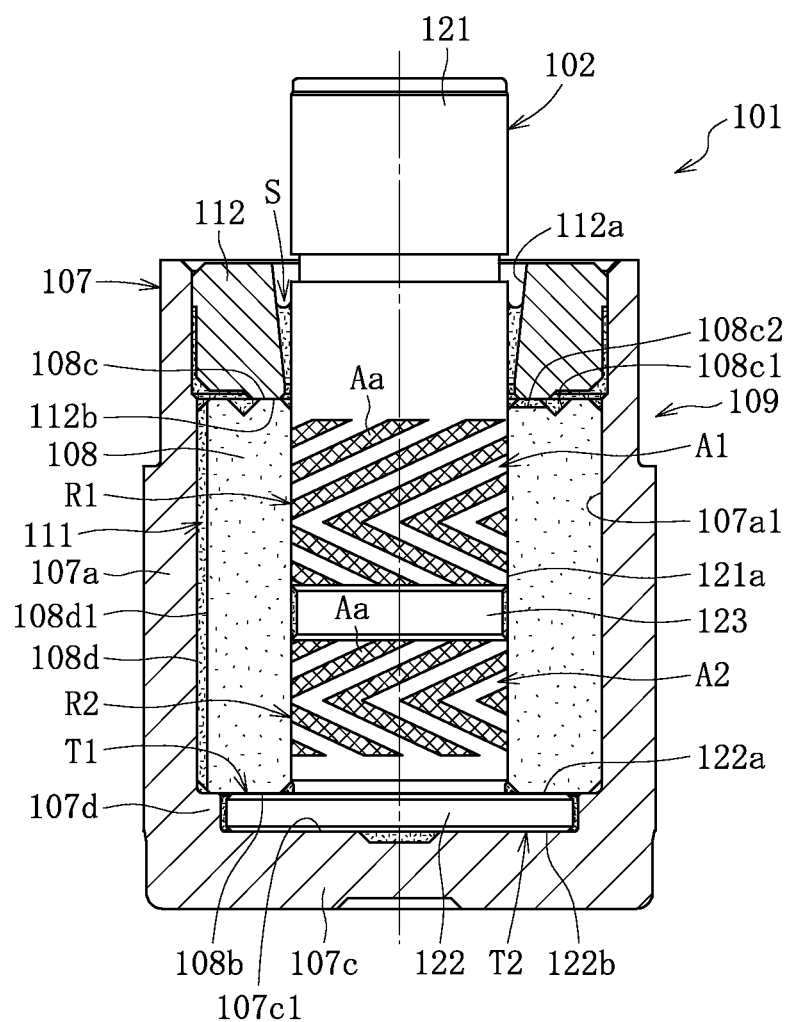
FIG. 11 is an axial sectional view of a fluid dynamic bearing device according to a second embodiment of the second invention of the present application.

FIG. 11 is an axial sectional view of a fluid dynamic bearing device 101 according to a second embodiment of this invention. The fluid dynamic bearing device 101 illustrated in FIG. 11 is different from that illustrated in FIG. 6 mainly in that the housing 107 integrally comprises a disk-like bottom portion 107c for closing the lower end of the cylindrical main body portion 107a and that the sealing space S is formed with a ring-like sealing member 112 fixed to an inner periphery of the upper end of the main body portion 107a. In other words, the second thrust bearing gap of the second thrust bearing portion T2 is formed between the lower end surface 122b of the flange portion 122 and an upper end surface 107c1 of the housing bottom portion 107c. Further, the sealing space S is formed between an inner peripheral surface 112a of the sealing member 112 and the outer peripheral surface 121a of the shaft portion 121. Note that, a step portion 107d is provided at a boundary portion between the main body portion 107a and the bottom portion 107c of the housing 107. The lower end surface 108b of the bearing sleeve 108 is held in abutment against the step portion 107d so as to position the bearing sleeve 108 relative to the housing 107 in the axial direction.

Figure 12:
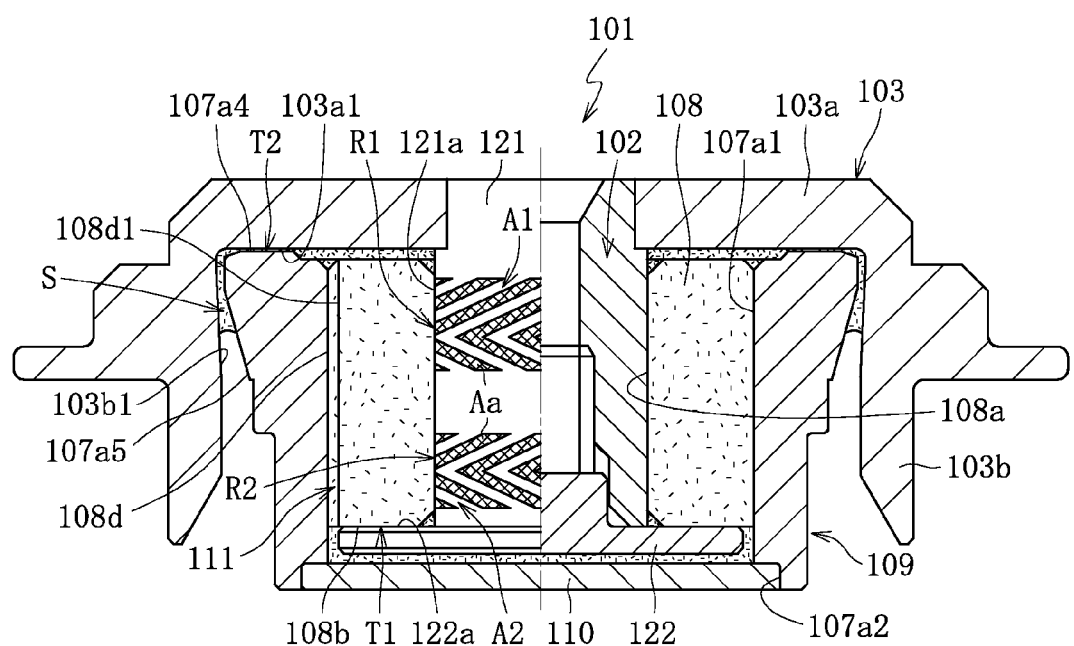
FIG. 12 is an axial sectional view of a fluid dynamic bearing device according to a third embodiment of the second invention of the present application.

FIG. 12 is an axial sectional view of a fluid dynamic bearing device 101 according to a third embodiment of this invention. The fluid dynamic bearing device 101 illustrated in FIG. 12 is different from that illustrated in FIG. 6 mainly in the following points. The disk hub 103 integrally comprises an annular portion 103a and a cylindrical portion 103b extending in the axial direction from a radially outer end of the annular portion 103a, and is provided at an upper end portion of the shaft member 102 (shaft portion 121). The second thrust bearing gap of the second thrust bearing portion T2 is provided between a lower end surface 103a1 of the annular portion 103a of the disk hub 103 and an opposing upper end surface 107a4 of the housing 107 (main body portion 107a). The sealing space S is provided between an upper outer peripheral surface 107*a*5 of the housing 107 and an inner peripheral surface 103*b*1 of the cylindrical portion 103*b* of the disk hub 103. Further, in this embodiment, the shaft portion 121 is formed into a shape of a thick cylinder, and the flange portion 122 is fixed by screwing to the lower end of the shaft portion 121.

Figure 13:
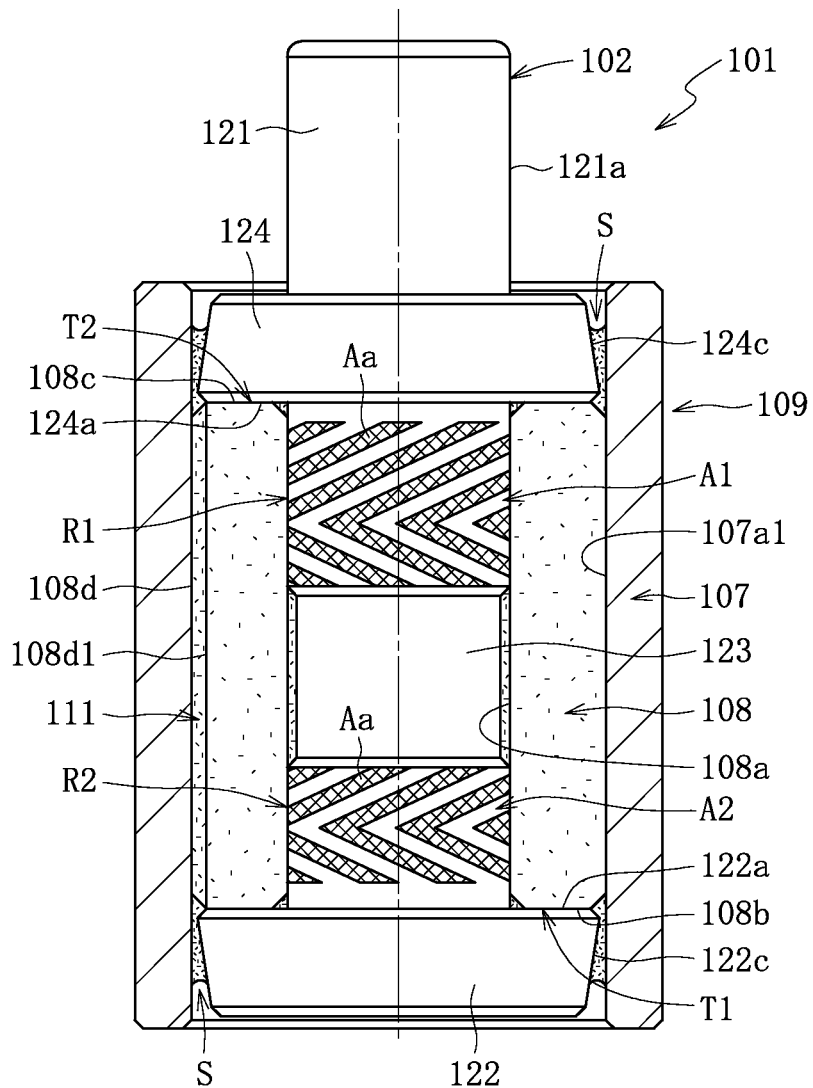
FIG. 13 is an axial sectional view of a fluid dynamic bearing device according to a fourth embodiment of the second invention of the present application.
Figure 14:
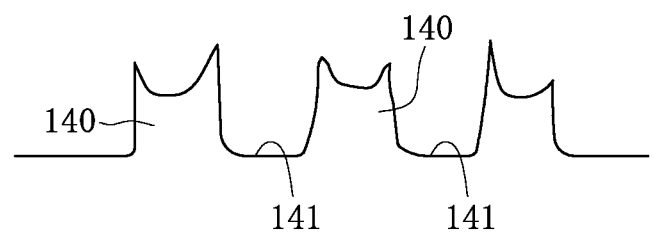
FIG. 14 is a view schematically illustrating a problem in a conventional method.

FIG. 13 is an axial sectional view of a fluid dynamic bearing device 101 according to a fourth embodiment of this invention. The fluid dynamic bearing device 101 illustrated in FIG. 13 is different from that illustrated in FIG. 6 mainly in the following points. A flange portion 124 is arranged on an upper side of the bearing sleeve 108 and fixed to the outer peripheral surface 121*a* of the shaft portion 121 so as to form sealing spaces S, which maintain oil levels of the lubricating oil, respectively between outer peripheral surfaces 122*c* and 124*c* of both the flange portions 122 and 124 of the shaft member 102 and the inner peripheral surface 107*a*1 of the housing 107 (main body portion 107*a*). The second thrust bearing gap of the second thrust bearing portion T2 is formed between a lower end surface 124*a* of the flange portion 124 and the upper end surface 108*c* of the bearing sleeve 108.

In each of the embodiments described above, the bearing member 109 comprises the housing 107 and the bearing sleeve 108 fixed to the inner periphery of the housing 107. However, the bearing member 109 may comprise an integral piece of a part corresponding to the housing 107 and a part corresponding to the bearing sleeve 108.

Further, in each of the cases described above, the dynamic pressure generating grooves Aa as the recessed portions for generating a dynamic pressure are arrayed in a herringbone pattern in the outer peripheral surface 121*a* of the shaft portion 121 so as to form the radial bearing portions R1 and R2 as a fluid dynamic bearing. However, the dynamic pressure generating grooves Aa may be arrayed in a spiral pattern or a stepped pattern (circumferential array of a plurality of axial grooves extending along the axial direction). Alternatively, the recessed portions for generating a dynamic pressure need not be formed into the groove-like shape as described above, and may be formed into recessed dimples.

Still further, in the case illustrated in each of the embodiments described above, the dynamic pressure generating grooves Ba and Ca as the recessed portions for generating a dynamic pressure are arrayed in a spiral pattern (or herringbone pattern) in the end surfaces of the flange portion 122 so as to form the thrust bearing portions T1 and T2 as a fluid dynamic bearing. However, any one or both of the dynamic pressure generating grooves Ba and Ca may be formed into a radial pattern extending in the radial direction (step bearing). Alternatively, the recessed portions for generating a dynamic pressure may be provided in end surfaces of members facing the end surfaces 122*a* and 122*b* of the flange portion 122 across the thrust bearing gaps (in the embodiment illustrated in FIG. 6, the lower end surface 108*b* of the bearing sleeve 108 and the upper end surface 110*a* of the lid member 110). Still alternatively, although not shown, the flange portion 122 need not be provided to the shaft member 102, and instead, what is called a pivot bearing that supports one end (lower end) of the shaft portion 121 in a contact manner may be provided as the thrust bearing portion.

Yet further, in each of the embodiments described above, the lubricating oil is used as a lubricating fluid filled in the internal space of the fluid dynamic bearing device 101. However, this invention is suitably applicable also to fluid dynamic bearing devices 101 that use, as the lubricating fluid, a lubricating grease, a magnetic fluid, and gases such as air.

Yet further, in each of the cases described above, this invention is applied to the fluid dynamic bearing devices 101 in which the shaft member 102 corresponds to a rotary side and the bearing sleeve 108 and the like correspond to a stationary side. However, this invention is suitably applicable also to a fluid dynamic bearing device 101 in which, reversely, the shaft member 102 corresponds to the stationary side and the bearing sleeve 108 and the like correspond to the rotary side.

Now, description is made of embodiments of a third invention of the present application with reference to FIGS. 15 to 29.

Figure 15:
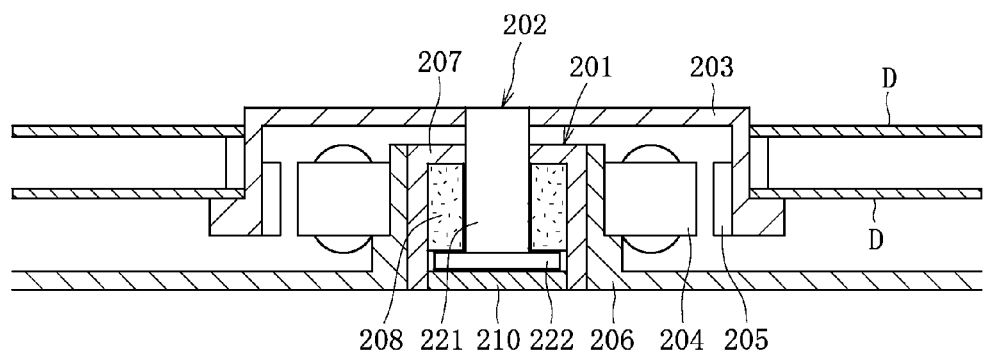
FIG. 15 is a sectional view conceptually illustrating another example of a spindle motor for an information apparatus incorporating a fluid dynamic bearing device.

FIG. 15 conceptually illustrates a structural example of a spindle motor for information apparatus, which incorporates a fluid dynamic bearing device. This spindle motor is used for a disk drive device for HDDs and the like, and comprises a fluid dynamic bearing device 201 for rotatably supporting a shaft member 202, a disk hub 203 fixed to the shaft member 202, stator coils 204 and a rotor magnet 205 facing each other across, for example, a radial gap, and a motor base 206. The stator coils 204 are fixed to an outer periphery of the motor base 206, and the rotor magnet 205 is fixed to an inner periphery of the disk hub 203. The fluid dynamic bearing device 201 comprises a housing 207 fixed to the inner periphery of the motor base 206. The disk hub 203 holds one or a plurality of disks D (two in the example of the figure). In the structure described above, when the stator coils 204 are energized, the rotor magnet 205 is rotated by an electromagnetic force generated between the stator coils 204 and the rotor magnet 205. With this, the disk hub 203 and the disks D held by the disk hub 203 are rotated integrally with the shaft member 202.

Figure 16:
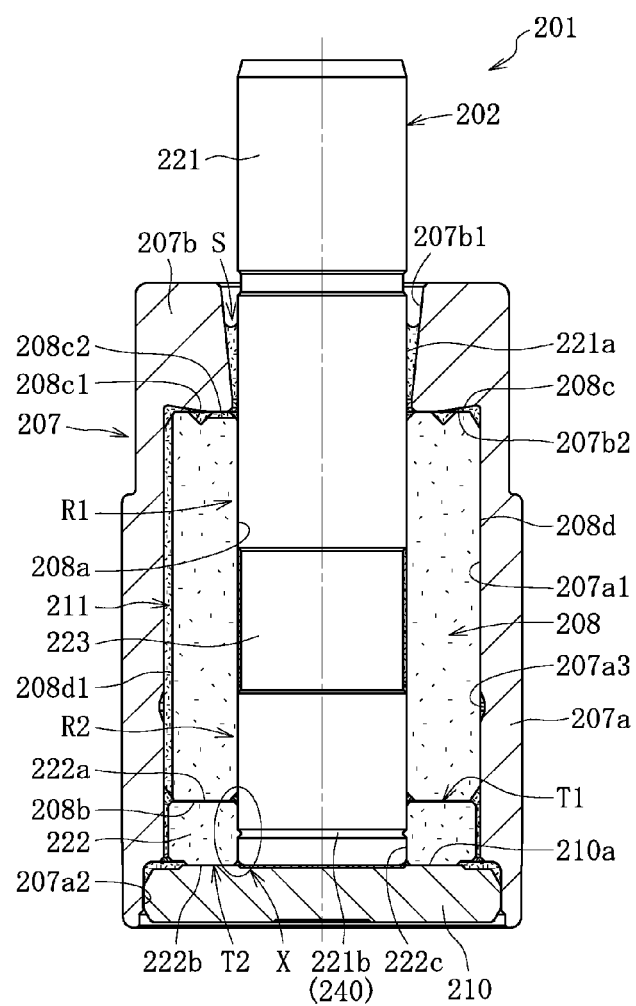
FIG. 16 is an axial sectional view of the fluid dynamic bearing device according to a first embodiment of a third invention of the present application.

FIG. 16 illustrates the fluid dynamic bearing device 201 according to a first embodiment of this invention. The fluid dynamic bearing device 201 comprises, as components, the shaft member 202 comprising a shaft portion 221 and a flange portion 222, a bearing sleeve 208 having an inner periphery along which the shaft portion 221 is inserted, the substantially cylindrical housing 207 having an inner periphery on which the bearing sleeve 208 is held, and a lid member 210 for closing an opening of one of end portions of the housing 207. A lubricating oil as a lubricating fluid (indicated by densely dotted hatching) is filled in an internal space. Note that, for the sake of convenience in description, a side on which the lid member 210 is provided is hereinafter referred to as a lower side, and an opposite side thereto in the axial direction is hereinafter referred to as an upper side. However, a usage (posture) of the fluid dynamic bearing device 201 is not limited thereto.

The housing 207 is obtained by forming an ingot material (for example, solid metal material of brass, stainless steel, and the like) into a substantially cylindrical shape opened at both axial end portions, and integrally comprises a main cylindrical body portion 207*a*, and a sealing portion 207*b* extending to a radially inner side from an upper end of the main body portion 207*a*. The main body portion 207*a* has an inner peripheral surface comprising a small diameter inner peripheral surface 207*a*1 having a relatively small diameter, and a large diameter inner peripheral surface 207*a*2 having a relatively large diameter. The bearing sleeve 208 and the lid member 210 are fixed respectively to the small diameter inner peripheral surface 207*a*1 and the large diameter inner peripheral surface 207*a*2. Fixing means for the bearing sleeve 208 and the lid member 210 with respect to the housing 207 is not particularly limited, and appropriate fixing means such as press-fitting, bonding, press-fit bonding, and welding may be employed. In this embodiment, the bearing sleeve 208 is fixed to the inner periphery of the housing 207 by what is called gap-filling bonding performed by loosely fitting the bearing sleeve 208 to the small diameter inner peripheral surface 207*a*1 of the main body portion 207*a* and interposing an adhesive in a gap therebetween. At predetermined positions in the axial direction on the small diameter inner peripheral surface 207a1, annular grooves 207a3 that function as adhesive pools are formed. When the adhesive is filled in the annular grooves 207a3 and is cured, a bonding strength of the bearing sleeve 208 with respect to the housing 207 is enhanced.

An inner peripheral surface 207b1 of the sealing portion 207b is formed into a tapered surface gradually reduced downward in diameter, and a wedge-like sealing space S gradually reduced downward in radial dimension is formed between the inner peripheral surface 207b1 and an opposing outer peripheral surface 221a of the shaft portion 221. An upper end surface 208c of the bearing sleeve 208 is held in abutment against a radially inner region of a lower end surface 207b2 of the sealing portion 207b. With this, the bearing sleeve 208 is positioned relative to the housing 207 in the axial direction. A radially outer region of the lower end surface 207b2 of the sealing portion 207b gradually recedes upward toward the radially outer side so as to form an annular gap between the lower end surface 207b2 and the upper end surface 208c of the bearing sleeve 208 and between the lower end surface 207b2 and an upper outer peripheral chamfer of the bearing sleeve 208. A radially inner rim portion of the annular gap is communicated to an annular groove 208c1 of the upper end surface 208c of the bearing sleeve 208.

The housing 207 structured as described above may be obtained by injection molding of a resin. Alternatively, the housing 207 may be obtained by injection molding of low-melting point metals typified by a magnesium alloy, an aluminum alloy, and the like, or may comprise a product of what is called MIM.

The bearing sleeve 208 is obtained by forming a porous body made of a sintered metal, in this case, a porous body made of a sintered metal containing iron as a main component (for example, 70 to 90 mass % of Fe and 30 to 10 mass % of Cu) into a cylindrical shape. The bearing sleeve 208 has a lower end surface 208b having an annular region that forms the thrust bearing gap of the first thrust bearing portion T1 between the lower end surface 208b and an opposing upper end surface 222a of the flange portion 222. The annular region is formed into a smooth and flat surface, and does not have a projection-recess like portion (such as the thrust dynamic pressure generating portion comprising dynamic pressure generating grooves and hill portions that define the dynamic pressure generating grooves). The upper end surface 208c of the bearing sleeve 208 is provided with the annular groove 208c1 and a radial groove 208c2 having a radially outer end communicated to the annular groove 208c1. The bearing sleeve 208 has an outer peripheral surface 208d provided with an axial groove 208d1 provided at one or a plurality of positions in the circumferential direction.

Figure 17:
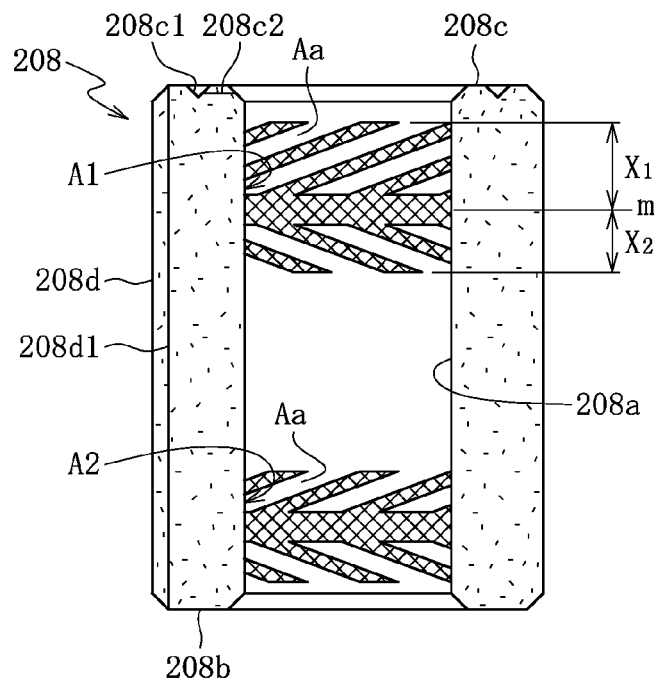
FIG. 17 is a sectional view of a bearing sleeve.

On an inner peripheral surface 208a of the bearing sleeve 208, cylindrical regions that serve as radial bearing surfaces for forming radial bearing gaps between the inner peripheral surface 208a and the opposing outer peripheral surface 221a of the shaft portion 221 are formed at two positions spaced apart from each other in the axial direction. In the cylindrical regions, as illustrated in FIG. 17, there are respectively formed radial dynamic pressure generating portions A1 and A2 each circumferentially provided with the plurality of dynamic pressure generating grooves Aa arrayed in a herringbone pattern. The dynamic pressure generating grooves Aa on the upper side are formed into an axially asymmetrical shape with respect to the axial center m (axial center between upper and lower inclined groove regions), and the axial dimension X1 of the upper region with respect to the axial center m is larger than the axial dimension X2 of the lower region. Meanwhile, the dynamic pressure generating grooves Aa on the lower region are formed into an axially symmetrical shape, and axial dimensions of upper and lower regions thereof are each smaller than the above-mentioned axial dimension X1. The dynamic pressure generating grooves Aa may be formed into a spiral pattern.

The lid member 210 is obtained by forming a metal material into a plate shape. The lid member 210 has an upper end surface 210a having an annular region that forms the thrust bearing gap of the second thrust bearing portion T2 between the upper end surface 210a and an opposing lower end surface 222b of the flange portion 222. The annular region is formed into a smooth and flat surface, and does not have a projection-recess like portion (such as the thrust dynamic pressure generating portion comprising dynamic pressure generating grooves and hill portions that define the dynamic pressure generating grooves).

The shaft portion 221 of the shaft member 202 is obtained by forming a highly rigid ingot material (for example, stainless steel such as SUS420J2) into a solid shaft shape, and the flange portion 222 thereof is provided to a lower end of the shaft portion 221. On the outer peripheral surface 221a of the shaft portion 221, a cylindrical middle relief portion 223 that recedes to the radially inner side is provided in a region facing a region between the radial bearing surfaces (radial dynamic pressure generating portions A1 and A2) of the inner peripheral surface 208a of the bearing sleeve 208. When the middle relief portion 223 is provided to the outer peripheral surface 221a of the shaft portion 221, a radial gap larger in gap width than the radial bearing gaps is formed between the inner peripheral surface 208a of the bearing sleeve 208, which is formed into a cylindrical surface having a substantially uniform diameter, and the middle relief portion 223. The radial gap can function as a lubricating oil pool, and hence, during operation of the bearing, the two radial bearing gaps vertically adjacent to each other in the axial direction can be filled with an ample amount of the lubricating oil. With this, rotational accuracy in the radial direction is stabilized. Further, the gap width of the above-mentioned radial gap is secured to be larger than those of the radial bearing gaps. Thus, torque loss can be reduced, which contributes to less electric power consumption of the motor, by extension, of electrical devices.

The flange portion 222 is obtained by forming a porous body made of a sintered metal, in this case, a porous body made of a sintered metal containing copper as a main component (for example, 60 mass % of Cu and 40 mass % of Fe) into an annular shape, and fixed to an outer periphery of the lower end of the shaft portion 221. Although detailed description of a fixation procedure is given later, in this case, as illustrated on an enlarged scale in FIG. 19, a press-fit fixation portion 225, which is formed by press-fitting the flange portion 222 (specifically, flange preform 222' illustrated, for example, in FIG. 20(a)) to the shaft portion 221, is interposed between the outer peripheral surface 221a of the shaft portion 221 and an inner peripheral surface 222c of the flange portion 222, which face each other. Then, a bulging portion 224, which is formed on the inner peripheral surface 222c of the flange preform 222' along with a pressing process on the flange portion 222 (flange preform 222'), is brought into close contact with the outer peripheral surface 221a of the shaft portion 221. In this way, the flange portion 222 is fixed to the outer peripheral surface 221a of the shaft portion 221.

On the outer peripheral surface 221a of the shaft portion 221, a recessed portion 221b is provided in (a substantially central portion in the axial direction of) a region in which the flange portion 222 is fixed, and the recessed portion 221b receives (a part of) the bulging portion 224 formed on the inner peripheral surface 222c of the flange portion 222. The recessed portion 221b in this embodiment is formed of a circumferential groove 240 extending in a circumferential direction of the shaft portion 221, more specifically, an annular groove extending over the entire periphery of the shaft portion 221. With this configuration, at a position between the outer peripheral surface 221a of the shaft portion 221 and the inner peripheral surface 222c of the flange portion 222, which face each other, there is formed a projection-recess fitting portion at which the outer peripheral surface 221a and the inner peripheral surface 222c are engaged with each other in the axial direction, and hence pull-out resistance of the flange portion 222 is enhanced. Although not shown, the circumferential groove 240 as the recessed portion 221b may be provided intermittently or partially to the outer peripheral surface 221a of the shaft portion 221. In this case, rotation of the flange portion 222 with respect to the shaft portion 221 is locked as well. Further, the recessed portion 221b need not be formed into the circumferential groove 240, and may be, for example, numerously provided in a dispersed manner.

Figure 18A:
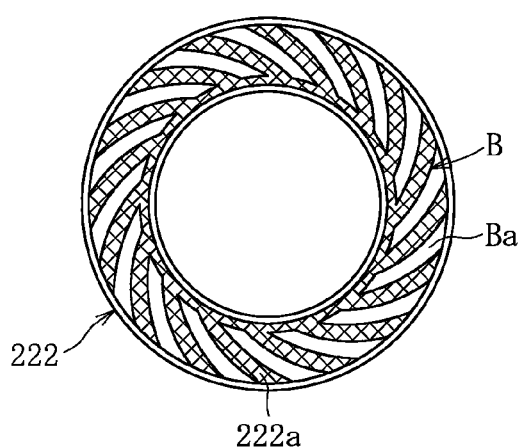
FIG. 18a is a view of an upper end surface of a flange portion.
Figure 18B:
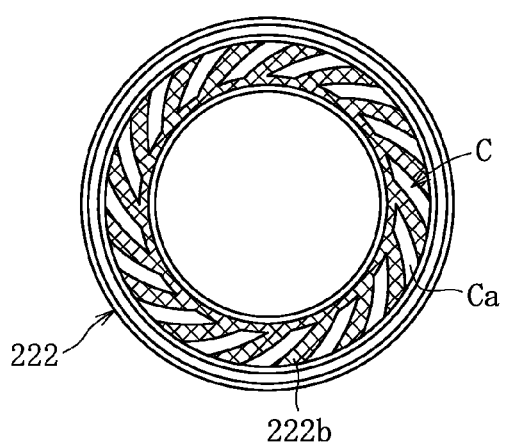
FIG. 18b is a view of a lower end surface of the flange portion.
Figure 19:
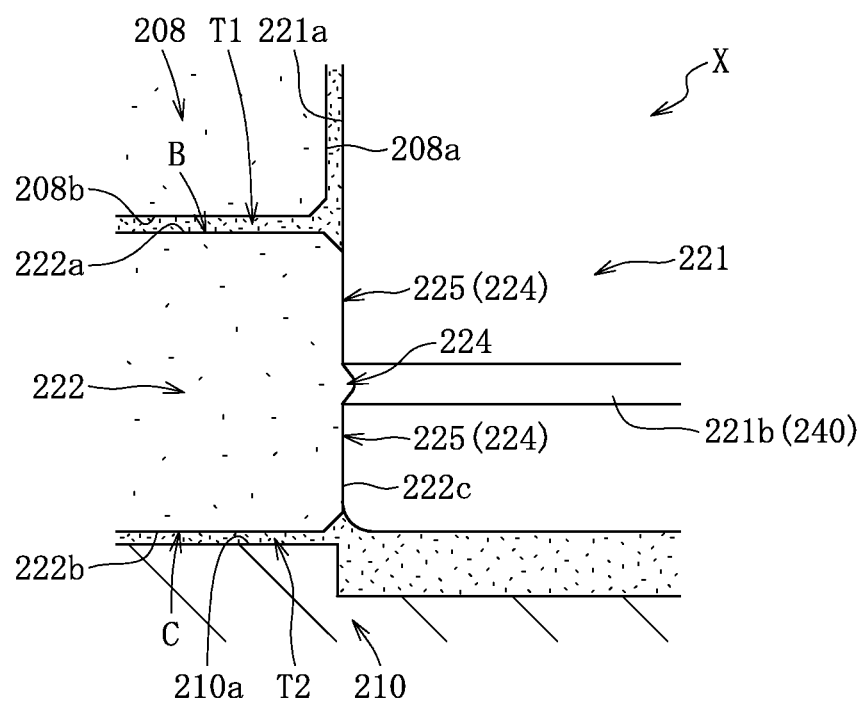
FIG. 19 is an enlarged view of a part X of FIG. 16.
Figure 29A:
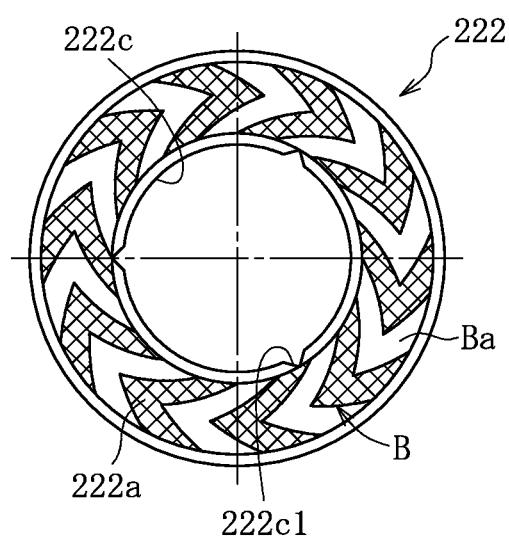
FIG. 29a is a view of an upper end surface of a flange portion of the fluid dynamic bearing device illustrated in FIG. 28.
Figure 29B:
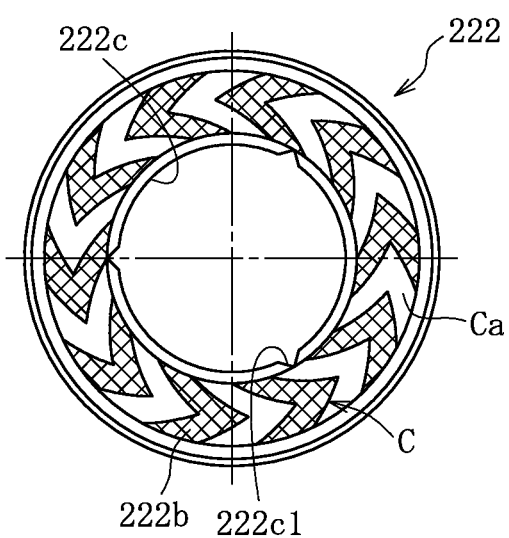
FIG. 29b is a view of a lower end surface of the flange portion of the fluid dynamic bearing device illustrated in FIG. 28.

Also as illustrated in FIG. 19, the upper end surface 222a of the flange portion 222 is provided with an annular region as a thrust bearing surface for forming the thrust bearing gap of the first thrust bearing portion T1 between the upper end surface 222a and the opposing lower end surface 208b of the bearing sleeve 208. In the annular region, as illustrated in FIG. 18(a), there is formed a thrust dynamic pressure generating portion B circumferentially provided with the plurality of dynamic pressure generating grooves Ba arrayed in a spiral pattern. Further, the lower end surface 222b of the flange portion 222 is provided with an annular region as a thrust bearing surface for forming the thrust bearing gap of the second thrust bearing portion T2 between the lower end surface 222b and the opposing upper end surface 210a of the lid member 210. In the annular region, as illustrated in FIG. 18(b), there is formed a thrust dynamic pressure generating portion C circumferentially provided with the plurality of dynamic pressure generating grooves Ca arrayed in a spiral pattern. As described below, the thrust dynamic pressure generating portions B and C are each molded by performing a pressing process on the flange preform 222' that is made of a sintered metal and to be formed into the flange portion 222. Thus, in the flange portion 222, at least regions provided with the thrust dynamic pressure generating portions B and C are formed with higher density than other parts (for example, density of from 7.3 g/cm³ to 8.0 g/cm³) so as to enhance abrasion resistance. The dynamic pressure generating grooves forming any one or both of the thrust dynamic pressure generating portions B and C may be formed into a herringbone pattern as illustrated in FIGS. 29(a) and 29(b).

With reference to FIG. 20, detailed description is made of a method of manufacturing the shaft member 202 structured as described above.

Figure 20A:
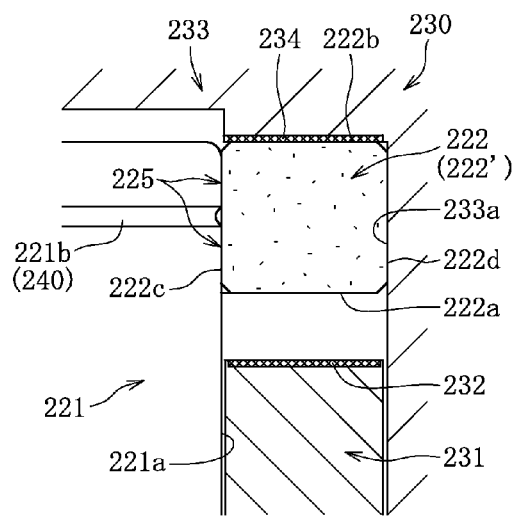
FIG. 20a is a main-part enlarged sectional view illustrating a state immediately before a pressing process.
Figure 20B:
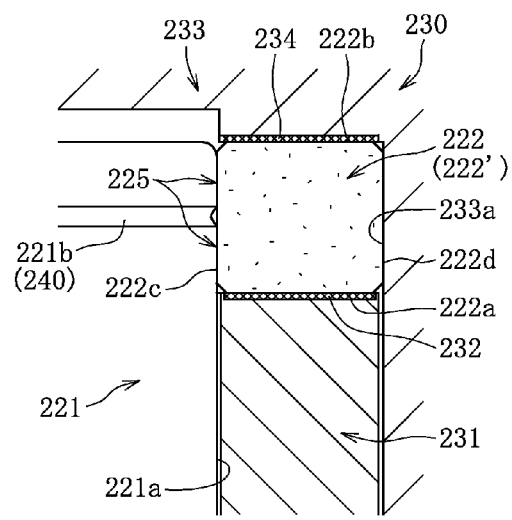
FIG. 20b is a main-part enlarged sectional view illustrating a state during the pressing process.
Figure 20C:
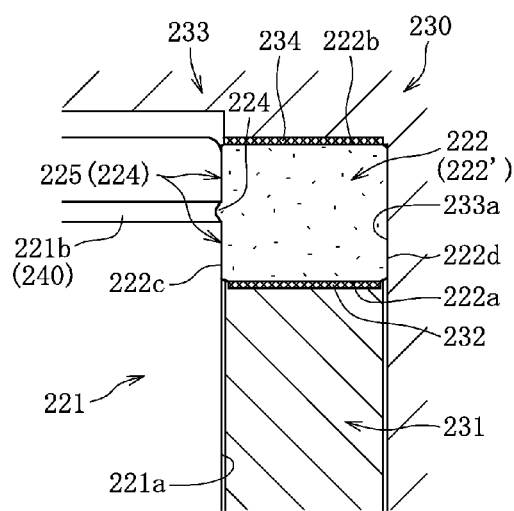
FIG. 20c is another main-part enlarged sectional view illustrating the state during the pressing process.

FIGS. 20(a) to 20(c) illustrate a pressing step in a series of steps of manufacturing the shaft member 202. In the pressing step, first, as illustrated in FIG. 20(a), the shaft portion 221 and the flange preform 222' separately produced are arranged in a press die set 230 comprising a first die 231 and a second die 233 arranged coaxially with each other and relatively movable close to and away from each other. Here, the flange preform 222' is made of a copper-based sintered compact obtained by sintering an annular green compact containing copper powder as a main component (for example, 60 mass % of Cu and 40 mass % of Fe), and has a density set within a range of from 7.2 g/cm³ to 7.9 g/cm³. The flange preform 222' is processed into the flange portion 222 as a finished product through the pressing step. The inner peripheral surface 222c is formed into a cylindrical surface having a uniform diameter, and both the end surfaces 222a and 222b are each formed into a smooth flat surface.

The first die 231 has a cylindrical shape capable of receiving the shaft portion 221 along an inner periphery thereof, and comprises a groove-patterned portion 232 provided in a region facing the flange preform 222' in the axial direction in conformity with a shape of the thrust dynamic pressure generating portion B (dynamic pressure generating grooves Ba) to be provided to the upper end surface 222a of the flange portion 222. The second die 233 comprises a cylindrical part arranged on a radially outer side with respect to the first die 231, a disk-like part arranged on an axial end side of the shaft portion 221, and a groove-patterned portion 234 provided in a region facing the flange preform 222' in the axial direction in conformity with a shape of the thrust dynamic pressure generating portion C to be provided to the lower end surface 222b of the flange portion 222. The second die 233 has an inner peripheral surface 233a having a radially inner dimension set to such a value that an outer peripheral surface 222d of the flange preform 222' can be held when the outer peripheral surface 222d of the flange preform 222' is bulged to the radially outer side along with the pressing process (value that the bulging of the outer peripheral surface 222d can be restricted).

In this embodiment, as illustrated in FIG. 20(a), the annular flange preform 222' is press-fitted to the outer peripheral surface 221a at the lower end of the shaft portion 221 so as to form the press-fit fixation portion 225, which is formed by fixing the flange preform 222' (flange portion 222) to the shaft portion 221 by press-fitting, between the outer peripheral surface 221a of the shaft portion 221 and the inner peripheral surface 222c of the flange preform 222', which face each other. Then, the shaft portion 221 is inserted along the inner periphery of the first die 231.

Next, as illustrated in FIGS. 20(b) and 20(c), the first die 231 and the second die 233 are moved closer relative to each other so as to pressurize the flange preform 222' from both sides in the axial direction. Along therewith, internal pores of the flange preform 222' are reduced, and deformable parts of both the end surfaces 222a and 222b of the flange preform 222' are plastically deformed in conformity with the groove-patterned portions 232 and 234. In this way, the thrust dynamic pressure generating portions B and C are molded respectively in the upper end surface 222a and the lower end surface 222b of the flange preform 222'. At the time of molding the thrust dynamic pressure generating portions B and C, the inner peripheral surface 222c and the outer peripheral surface 222d of the flange preform 222' are bulged respectively to the radially inner side and the radially outer side. However, the outer peripheral surface 222d of the flange preform 222' is held by the inner peripheral surface 233a of the second die 233, and hence the bulging thereof is restricted. The groove-patterned portions 232 and 234 are held in firm and close contact respectively with both the end surfaces 222a and 222b of the flange preform 222'. Thus, when the flange preform 222' is pressurized from both the sides in the axial direction so as to mold the thrust dynamic pressure generating portions B and C respectively in both the end surfaces of the flange preform 222', the deformable parts of the flange preform 222' are subjected to plastic flow mainly toward the radially inner side. Then, along with the plastic flow of the deformable parts, the bulging portion 224 formed on the inner peripheral surface 222c is brought into close contact with the outer peripheral surface 221a of the shaft portion 221. In this way, the flange preform 222' is fixed to the outer peripheral surface 221a of the shaft portion 221. On the outer peripheral surface 221a of the shaft portion 221, the circumferential groove 240 as the recessed portion 221b is formed in the region in which the flange portion 222 (flange preform 222') is fixed, and the recessed portion 221b receives the part of the bulging portion 224.

Figure 20D:
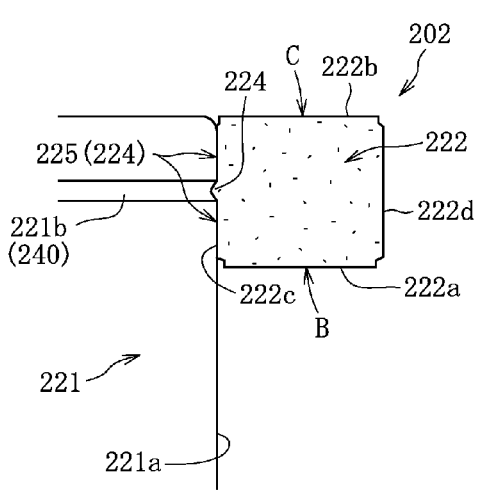
FIG. 20d is a main-part enlarged sectional view of a shaft portion after completion of the pressing process.

After the flange preform 222' is fixed to the shaft portion 221 at the same time when the thrust dynamic pressure generating portions B and C are molded respectively in both the end surfaces 222a and 222b of the flange preform 222' by the pressing process as described above, the first die 231 and the second die 233 are moved relatively away from each other. Then, a single product of the shaft portion 221 and the flange preform 222' is taken out from the press die set 230. In this way, as illustrated in FIG. 20(d), the shaft member 202 is completed, in which the flange portion 222 is fixed to the lower end of the shaft portion 221, and the thrust dynamic pressure generating portions B and C are molded respectively in the upper end surface 222a and the lower end surface 222b of the flange portion 222.

In the fluid dynamic bearing device 201 structured as described above, the radial bearing gaps are formed respectively between the radial bearing surfaces formed on the inner peripheral surface 208a of the bearing sleeve 208 at two upper and lower positions spaced apart from each other and the opposing outer peripheral surface 221a of the shaft portion 221. Then, along with the rotation of the shaft member 202, pressures of oil films formed in both the radial bearing gaps are increased by the dynamic pressure actions of the dynamic pressure generating grooves Aa and Aa. As a result, the radial bearing portions R1 and R2 for supporting the shaft member 202 in a non-contact manner in the radial direction are formed at the two positions spaced apart from each other in the axial direction. Simultaneously, the thrust bearing gaps are respectively formed between the thrust bearing surface provided to the upper end surface 222a of the flange portion 222 and the opposing lower end surface 208b of the bearing sleeve 208, and between the thrust bearing surface provided to the lower end surface 222b of the flange portion 222 and the opposing upper end surface 210a of the lid member 210. Then, along with the rotation of the shaft member 202, pressures of oil films formed in both the thrust bearing gaps are increased respectively by the dynamic pressure actions of the dynamic pressure generating grooves Ba and Ca. As a result, the first thrust bearing portion T1 and the second thrust bearing portion T2 for supporting the shaft member 202 in a non-contact manner in both the thrust directions are formed.

Further, the sealing space S has a wedge-like shape gradually reduced in radial dimension toward an inner side of the housing 207, and hence the lubricating oil in the sealing space S is drawn-in by a drawing-in action of the capillary force toward the inner side of the housing 207. Further, the sealing space S has a buffering function for absorbing the volumetric change amount generated along with the temperature change of the lubricating oil filled in the internal space of the housing 207, and the oil level of the lubricating oil is constantly maintained within the sealing space S within a range of expected temperature changes. Thus, leakage of the lubricating oil from the inside of the housing 207 to the outside is effectively prevented.

Further, as described above, with regard to the dynamic pressure generating grooves Aa on the upper side, the axial dimension X1 of the upper region with respect to the axial center m is set to be larger than the axial dimension X2 of the lower region. Thus, at the time of the rotation of the shaft member 202, a force (pumping force) of drawing-in the lubricating oil by the dynamic pressure generating grooves Aa is relatively greater in the upper region than in the lower region. With this structure, the lubricating oil filled in the gap between the inner peripheral surface 208a of the bearing sleeve 208 and the outer peripheral surface 221a of the shaft portion 221 flows downward. Then, the lubricating oil circulates through a path formed of the thrust bearing gap of the first thrust bearing portion T1, an axial fluid passageway 221 formed of the axial groove 208d1 of the bearing sleeve 208, an annular space formed of an upper outer peripheral chamfer of the bearing sleeve 208 and the like, and a fluid passageway formed of the annular groove 208c1 and the radial grooves 208c2 of the bearing sleeve 208. In this way, the lubricating oil is re-drawn into the radial bearing gap of the first radial bearing portion R1.

With such a structure, a pressure balance of the lubricating oil can be maintained. Simultaneously, problems such as generation of bubbles along with the local generation of the negative pressure, and the leakage of the lubricating oil and occurrence of vibration due to the generation of the bubbles can be solved. The sealing space S is communicated to the circulation path described above. Thus, even when the bubbles are mixed in the lubricating oil for some reasons, the bubbles are discharged to the outside air from an oil surface (air-liquid interface) of the lubricating oil in the sealing space S when the bubbles circulate along with the lubricating oil. As a result, adverse effects due to the bubbles are more effectively prevented.

As described above, in the fluid dynamic bearing device 201 according to this invention, the flange portion 222 is obtained by forming a sintered metal into an annular shape, comprises the thrust dynamic pressure generating portions B and C molded in the end surfaces 222a and 222b by the pressing process, and is fixed to the shaft portion 221 by holding the bulging portion 224, which is formed on the inner peripheral surface 222c by the pressing process, in close contact with the outer peripheral surface 221a of the shaft portion 221. When the flange portion 222 is made of the sintered metal, through adjustment of porosity of the flange portion 222 (flange preform 222'), a deformation amount (degree of plastic deformation) of the flange preform 222' generated along with the pressing process can be optimized. In other words, through adjustment of the porosity, measures such as enhancement in formability of each of the thrust dynamic pressure generating portions B and C molded respectively in the end surfaces 222a and 222b, enhancement in fastening strength of the flange portion 222 with respect to the shaft portion 221, and enhancement of both the formability and the fastening strength can be easily selected. In addition, a degree of spring-back generated along with release of a compressive force applied at the time of the pressing process can also be adjusted. Thus, even when a separate finishing process and the like after the pressing process are omitted, it is possible to easily mass-produce a separate type flanged shaft member 202 that is excellent in molding accuracy of the thrust dynamic pressure generating portions B and C, in flatness and the like of the end surfaces 222a and 222b, and in fastening strength of the flange portion 222 with respect to the shaft portion 221.

Further, at the position between the outer peripheral surface 221a of the shaft portion 221 and the inner peripheral surface 222c of the flange portion 222, which face each other, the press-fit fixation portion 225 formed by press-fitting the flange preform 222' to the shaft portion 221 is provided. Thus, at the time of performing the pressing process, a posture of the flange preform 222' with respect to the shaft portion 221 is less liable to be disturbed. As a result, advantages can be obtained in molding the thrust dynamic pressure generating portions B and C with high accuracy, and in providing the shaft member 202 excellent in accuracy between the shaft portion 221 and the flange portion 222 (such as perpendicularity between the outer peripheral surface 221a of the shaft portion 221 and each of the end surfaces 222a and 222b of the flange portion 222, and coaxiality between the shaft portion 221 and the flange portion 222).

Further, in the fluid dynamic bearing device 201 described above, the flange portion 222 that forms both the thrust bearing gaps, and the bearing sleeve 208 that forms the thrust bearing gap of the first thrust bearing portion T1 between the bearing sleeve 208 and the flange portion 222 are each made of a sintered metal. Thus, during the operation of the fluid dynamic bearing device 201, the lubricating oil retained in the internal pores of each of the flange portion 222 and the bearing sleeve 208 is supplied to the thrust bearing gaps. Therefore, a probability of occurrence of failures such as the generation of negative pressure in a part of regions in the thrust bearing gaps due to deficiency of the lubricating oil to be interposed in the thrust bearing gaps can be reduced as much as possible. As a result, rotational accuracy in the thrust directions is stably maintained.

Note that, when the same type of sintered metals are used for forming the flange portion 222 and the bearing sleeve 208 (sintered metals containing the same main component), during the operation of the fluid dynamic bearing device 201, the flange portion 222 and the bearing sleeve 208 are liable to adhere to each other. In this regard, in this embodiment, the flange portion 222 is made of a copper-based sintered metal, and the bearing sleeve 208 is made of an iron-based sintered metal. Thus, the above-mentioned failures are less liable to occur. Further, copper has processability higher than those of iron, and hence employment of the copper-based sintered metal for formation of the flange portion 222 (flange preform 222') to be subjected to the pressing process is advantageous in enhancing formability of each of the thrust dynamic pressure generating portions B and C, and enhancing fastening strength of the flange portion 222 with respect to the shaft portion 221. Meanwhile, iron is less expensive than copper, and hence, through employment of the iron-based sintered metal for formation of the bearing sleeve 208 having a relatively larger volume, a cost increase can be suppressed.

Further, when the flange portion 222 and the bearing sleeve 208 are made of a sintered metal, a larger amount of the lubricating oil is interposed in the internal space. In accordance therewith, a large volume (axial dimension) of the sealing space S needs to be secured, and hence there are disadvantages in securing required bearing performance, in particular, a moment rigidity. As a countermeasure, in this embodiment, although both the flange portion 222 and the bearing sleeve 208 were made of a sintered metal, the density of the flange preform 222' to be used was set to such an extent as to prevent deterioration in processability, and the density of the bearing sleeve 208 was set to be high. Specifically, as described above, the density of the flange preform 222' to be used was set within the range of from 7.2 g/cm$^3$ to 7.9 g/cm$^3$, and the density of the bearing sleeve 208 was set to 7.2 g/cm$^3$. In the flange portion 222, densities of porous structures of the parts plastically deformed along with the pressing process (both end surfaces 222a and 222b, inner peripheral surface 222c, and outer peripheral surface 222d) become much higher to range from 7.3 g/cm$^3$ to 8.0 g/cm$^3$.

The manner of fixing the flange portion 222 to the shaft portion 221 is not limited to the manner described above, and the flange portion 222 may be fixed to the shaft portion 221 as in the following manner.

Figure 21:
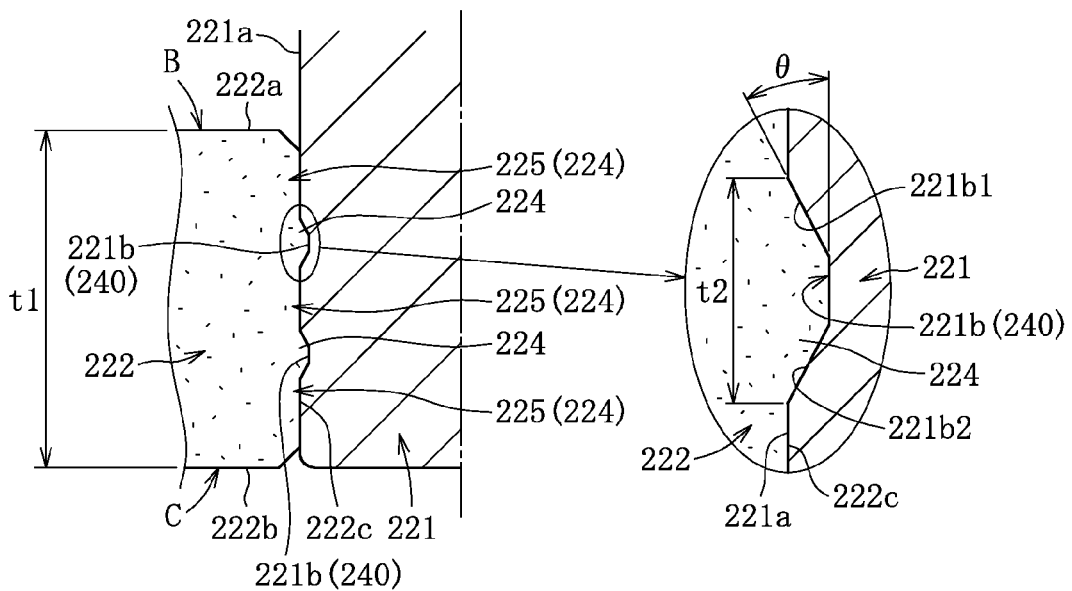
FIG. 21 is a main-part enlarged sectional view of a shaft portion according to a modification of the present application.

FIG. 21 illustrates a configuration in which circumferential grooves 240 as recessed portions 221b are provided at two positions spaced apart from each other in the axial direction in a region facing the inner peripheral surface 222c of the flange portion 222 on the outer peripheral surface 221a of the shaft portion 221. More specifically, in this embodiment, the press-fit fixation portions 225 each formed by press-fitting the flange preform 222' to the outer periphery of the lower end of the shaft portion 221 and projection-recess fitting portions each formed by receiving the bulging portion 224 of the flange preform 222' in the circumferential groove 240 are provided alternately to each other in the axial direction. With this, the flange portion 222 is fixed to the shaft portion 221. In this case, the pull-out resistance of the flange portion 222 is approximately doubled in comparison with that in the configuration described above in which only one circumferential groove 240 is provided in the axial direction.

The circumferential grooves 240 each have a groove width (groove width at an opening portion of the circumferential groove 240; the same applies hereinafter) t2 set to be 5% or more and 20% or less of a thickness t1 of the flange portion 222 ($0.05 t1 \leq t2 \leq 0.2 t1$). Here, the flange portion 222 having the thickness t1 of 1.5 mm is used, and the groove width t2 of each of the circumferential grooves is set to 0.2 mm. Note that, the press-fit fixation portions 225 each have an axial dimension set to 0.3 mm, and chamfered portions provided along inner rim portions at both ends of the flange portion 222 each have an axial dimension set to 0.1 mm. The groove width t2 of each of the circumferential grooves 240 is set within the above-mentioned range for the following reason.

It is conceivable that the pull-out resistance of the flange portion 222 with respect to the shaft portion 221 can be increased in proportion to the number of the recessed portions 221b (circumferential grooves 240) to be provided in the axial direction. However, the thickness t1 of the flange portion 222 is limited (has an upper limit value) so as to secure required axial dimensions of other members and parts of the fluid dynamic bearing device 201. Therefore, in order to provide a large number of the circumferential grooves 240 in the axial direction, it is necessary to set the groove width t2 of each of the circumferential grooves 240 to be small. However, as the groove width t2 is set to be smaller, smoothness of inflow of deformable parts into the circumferential grooves 240 is deteriorated. As a result, the pull-out resistance of the flange portion 222 may not be effectively enhanced. In view of this, a lower limit value of the groove width t2 of each of the circumferential grooves 240 was set to be 5% or more of the thickness t1 of the flange portion 222. Meanwhile, when a region provided with the recessed portions 221b (circumferential grooves 240) occupies a larger area in a region facing the inner peripheral surface 222c of the flange portion 222 on the outer peripheral surface 221a of the shaft portion 221 as a result of providing the large number of circumferential grooves 240 in the axial direction, or providing circumferential grooves 240 each having a large groove width t2, fixing accuracy of the flange portion 222 with respect to the shaft portion 221 is liable to be adversely affected. As a countermeasure, an upper limit value of the groove width t2 of each of the circumferential grooves 240 was set to be 20% or smaller of the thickness t1 of the flange portion 222.

Figure 22:
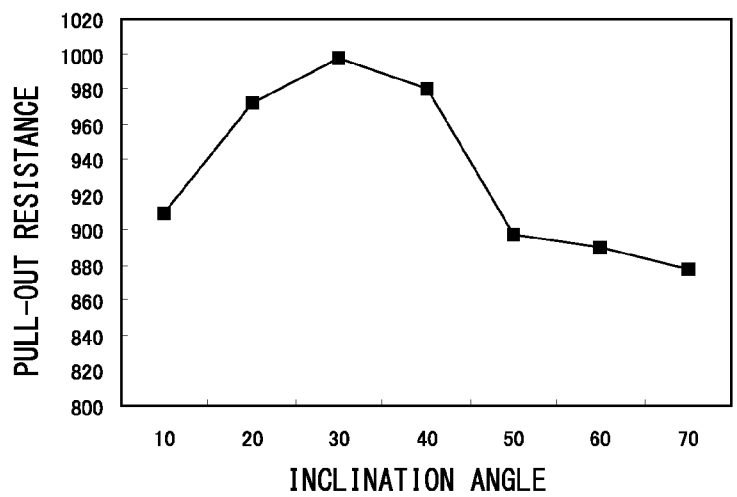
FIG. 22 is a chart showing measurement results of confirmatory tests.

Further, in order to enhance the smoothness of inflow of the deformable parts of the flange preform 222' into the circumferential grooves 240 (sufficiency in the circumferential grooves 240), in other words, the pull-out resistance of the flange portion 222, the circumferential grooves 240 as the recessed portions 221b were each formed into a tapered shape in cross-section, in which the groove width t2 is gradually reduced toward the groove bottom side. In this case, an inclination angle θ of each tapered inner wall surface 221b1 of each of the recessed portions 221b (circumferential grooves 240) with respect to an axial line is desirably set to 20° or more and 40° or less (20°≤θ≤40°). This numerical range is obtained by measuring the magnitude of a pressing force in the axial direction (pull-out resistance of the flange portion 222), at which the flange portion 222 is pulled out from the shaft portion 221 after the circumferential grooves 240 are provided at two positions spaced apart from each other in the axial direction on the outer peripheral surface 221a of each of the shaft portions 221 in cases where the inclination angle θ is set to 10°, 20°, 30°, 40°, 50°, 60°, and 70°, and the flange portion 222 is fixed to each of the shaft portions 221 in the manner as illustrated in FIGS. 20(a) to 20(d). FIG. 22 shows measuring results (average value of five samples formed at each of the angles).

As is clearly understood from FIG. 22, the pull-out resistance of the flange portion 222 peaked at the inclination angle θ of 30°, and a reduction rate of the pull-out resistance was high at inclination angles θ of less than 20°. This is probably because, as the inclination angle θ becomes smaller, the smoothness of inflow of the deformable parts into the circumferential grooves 240 becomes more satisfactory, and meanwhile, a desired groove depth is more difficult to secure. Further, the reduction rate of the pull-out resistance was high also at inclination angles θ of more than 40°. This is probably because the smoothness of inflow of the deformable parts into the circumferential grooves 240 is deteriorated at the inclination angles θ of more than 40°.

Note that, the configuration described above with reference to FIG. 21 is applicable not only to the above-mentioned fluid dynamic bearing device 201 illustrated in FIG. 16, but also to fluid dynamic bearing devices 201 according to other embodiments described below (refer, for example, to FIG. 25).

Figure 23:
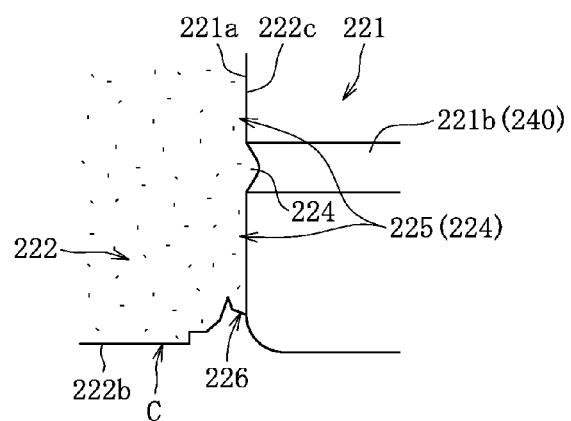
FIG. 23 is a main-part enlarged sectional view of a shaft portion according to another modification of the present application.

Further, in order to much further enhance the fastening strength of the flange portion 222 with respect to the shaft portion 221, the configuration illustrated, for example, in FIG. 23 may be employed instead of the configuration illustrated in FIG. 21, or in addition to the configuration illustrated in FIG. 21. In FIG. 23, the flange preform 222' is partially plastically deformed to form a crimp portion 226 for crimping and fixing the flange portion 222 with respect to the shaft portion 221.

Figure 24A:
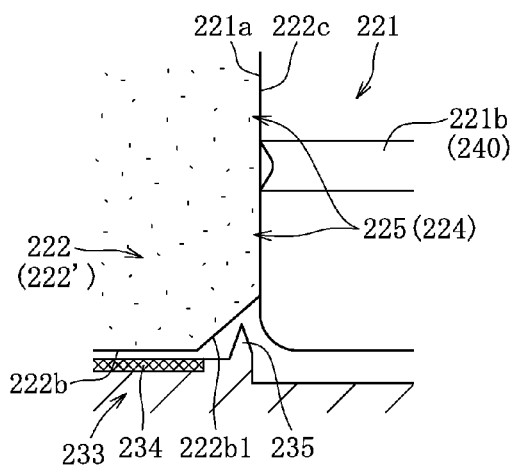
FIG. 24a is a main-part enlarged sectional view schematically illustrating a manufacturing step of the shaft member illustrated in FIG. 23, specifically, illustrating a state immediately before a pressing process.
Figure 24B:
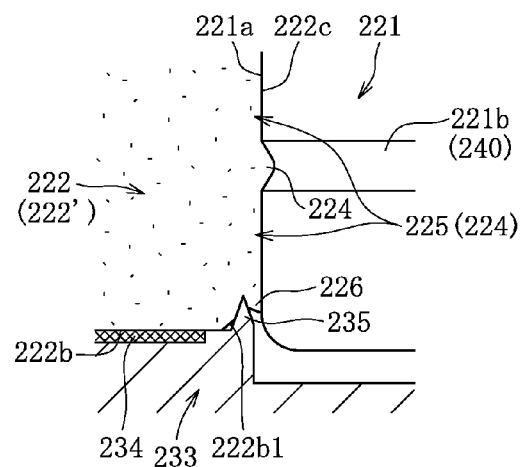
FIG. 24b is another main-part enlarged sectional view schematically illustrating the manufacturing step of the shaft member illustrated in FIG. 23, specifically, illustrating a state during the pressing process.

As illustrated, for example, in FIG. 24(a), when a crimp pattern 235 is provided in a region facing a lower inner peripheral chamfer 222b1 of the flange preform 222' on the second die 233 for pressurizing the lower end surface 222b of the flange preform 222' in the axial direction, the crimp portion 226 can be formed simultaneously with molding of the thrust dynamic pressure generating portions B and C. In other words, when the second die 233 is provided with the crimp pattern 235, as illustrated in FIG. 24(b), at the time of pressurizing the lower end surface 222b of the flange preform 222' in the axial direction with the second die 233, the crimp pattern 235 bites into the lower inner peripheral chamfer 222b1 of the flange preform 222' so as to partially plastically deform the flange preform 222'. In this way, the crimp portion 226 is formed on the flange preform 222' (flange portion 222).

Note that, the crimp portion 226 may be formed by a step separate from the pressing step of performing the pressing process on the flange preform 222'.

The fluid dynamic bearing device 201 according to the one embodiment of this invention is described above. However, this invention is applicable not only to the fluid dynamic bearing device 201 according to the one embodiment described above. Now, with reference to the drawings, description is made of fluid dynamic bearing devices 201 according to other embodiments, to which this invention is applicable. In the other embodiments described below, for the sake of simplicity of description, substantially the same components as those in the embodiment described above are denoted by the same reference symbols, and redundant description thereof is omitted.

Figure 25:
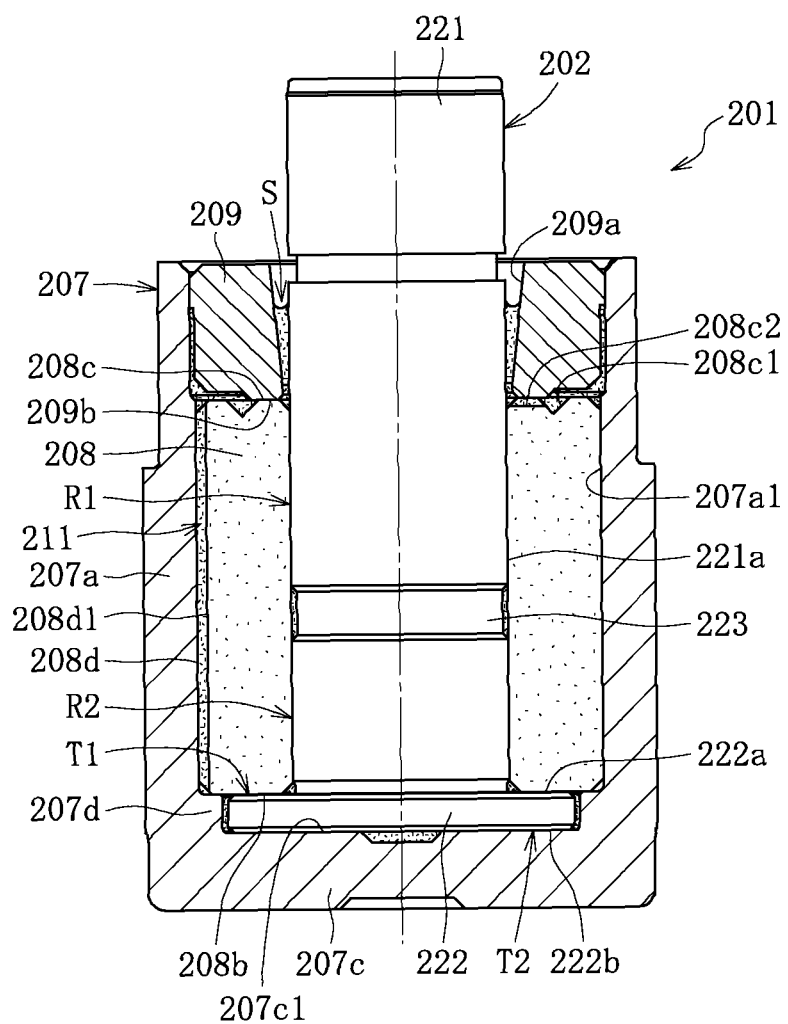
FIG. 25 is an axial sectional view of a fluid dynamic bearing device according to a second embodiment of the third invention of the present application.

FIG. 25 is an axial sectional view of a fluid dynamic bearing device 201 according to a second embodiment of this invention. The fluid dynamic bearing device 201 illustrated in FIG. 25 is different from that illustrated in FIG. 16 mainly in that the housing 207 is formed into a cup-like shape that integrally comprises the main body portion 207a and a disk-like bottom portion 207c for closing the lower end of the main body portion 207a, and that the sealing space S is formed with a ring-like sealing member 209 fixed to an inner periphery of the upper end of the main body portion 207a. With this configuration, the second thrust bearing gap of the second thrust bearing portion T2 is formed between the lower end surface 222b of the flange portion 222 and an upper end surface 207c1 of the housing bottom portion 207c. Further, the sealing space S is formed between an inner peripheral surface 209a of the sealing member 209 and the outer peripheral surface 221a of the shaft portion 221. Note that, a step portion 207d is provided at a boundary portion between the main body portion 207a and the bottom portion 207c of the housing 207. The lower end surface 208b of the bearing sleeve 208 is held in abutment against the step portion 207d so as to position the bearing sleeve 208 relative to the housing 207 in the axial direction (determine the gap width between the two thrust bearing gaps).

Figure 26:
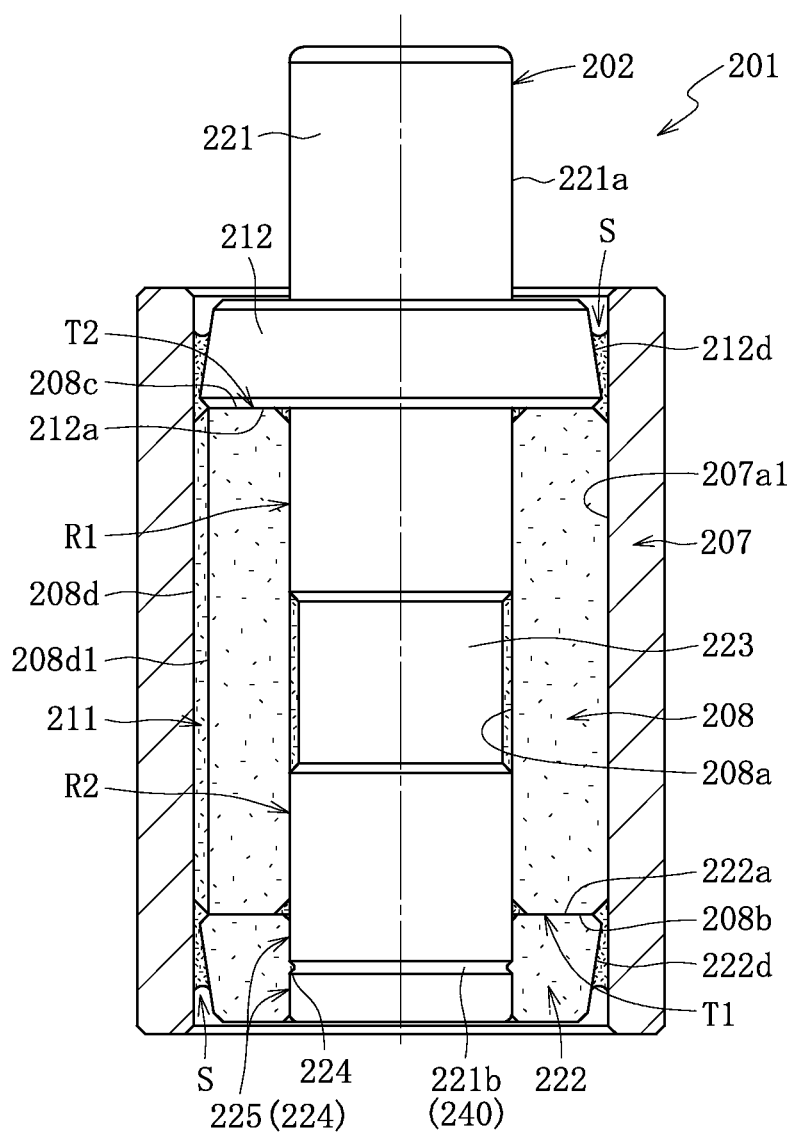
FIG. 26 is an axial sectional view of a fluid dynamic bearing device according to a third embodiment of the third invention of the present application.

FIG. 26 is an axial sectional view of a fluid dynamic bearing device 201 according to a third embodiment of this invention. The fluid dynamic bearing device 201 illustrated in FIG. 26 is different from that illustrated in FIG. 16 mainly in the following points. A flange portion 212 is arranged on an upper side of the bearing sleeve 208 and fixed to the outer peripheral surface 221a of the shaft portion 221 so as to form sealing spaces S, which maintain oil levels of the lubricating oil between the outer peripheral surface 222d of the flange portion 222 of the shaft member 202 and the inner peripheral surface 207a1 of the housing 207 (main body portion 207a) and between an outer peripheral surface 212d of the flange portion 212 of the shaft member 202 and the inner peripheral surface 207a1 of the housing 207. The second thrust bearing gap of the second thrust bearing portion T2 is formed between a lower end surface 212a of the flange portion 212 (on the upper side in FIG. 26) and the upper end surface 208c of the bearing sleeve 208. Thus, a thrust dynamic pressure generating portion is not molded in the lower end surface of the flange portion 222 on the lower side in FIG. 26, but the flange portion 222 on the lower side of the shaft member 202 in the example of the figure has the configuration of this invention. In other words, this invention is suitably applicable not only to the case of molding thrust dynamic pressure generating portions in both the end surfaces of the flange preform, but also to the case of molding a thrust dynamic pressure generating portion only in one of the end surfaces of the flange preform.

Figure 27:
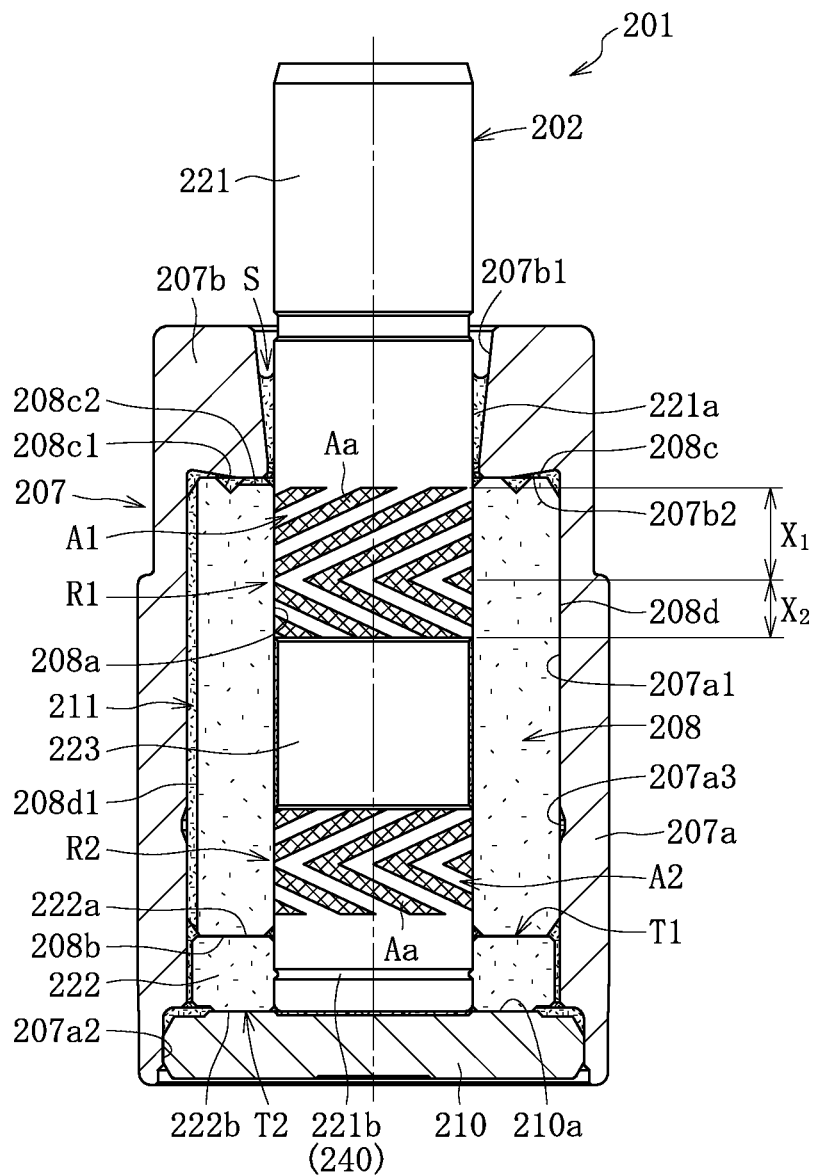
FIG. 27 is an axial sectional view of a fluid dynamic bearing device according to a fourth embodiment of the third invention of the present application.

FIG. 27 is an axial sectional view of a fluid dynamic bearing device 201 according to a fourth embodiment of this invention. The fluid dynamic bearing device 201 illustrated in FIG. 27 is different from that illustrated in FIG. 16 mainly in that the radial dynamic pressure generating portions A1 and A2 (dynamic pressure generating grooves Aa: refer to cross-hatching in FIG. 27) for generating a fluid dynamic pressure in the radial bearing gaps of the radial bearing portions R1 and R2 are formed on the outer peripheral surface 221a of the shaft portion 221, which faces the inner peripheral surface 208a of the bearing sleeve 208 across the radial bearing gaps.

Here, a widely employed method of forming, as in the embodiments described above, the dynamic pressure generating grooves Aa in the inner peripheral surface 208a of the bearing sleeve 208 made of a sintered metal comprises: inserting a core rod having an outer peripheral surface provided with a groove-patterned portion in conformity with a shape of dynamic pressure generating grooves along an inner periphery of a sintered compact formed into a cylindrical shape; applying, in this state, a compressive force to the sintered compact from both sides in an axial direction; causing an inner peripheral surface of the sintered compact to bite into the outer peripheral surface of the core rod so as to transfer a shape of the groove-patterned portion to the inner peripheral surface of the sintered compact; and then withdrawing the core rod from the inner periphery of the sintered compact by utilizing spring-back of the sintered compact, which is generated along with release of the compressive force. However, when the bearing sleeve 208 has a large axial dimension, a significantly greater compressive force needs to be applied to the sintered compact at the time of processing the dynamic pressure generating grooves Aa. Thus, there occur significant variation in internal density, deterioration in accuracy of each part of the bearing sleeve 208, and the like. In this way, processing accuracy is limited.

Meanwhile, when the dynamic pressure generating grooves Aa are provided in the outer peripheral surface 221a of the shaft portion 221, the dynamic pressure generating grooves Aa can be formed finely, easily, and accurately by a combination of relatively simple means such as rolling and grinding. In addition, the inner peripheral surface 208a of the bearing sleeve 208 can be formed into an even and smooth cylindrical surface. Thus, in this case, the manufacturing step of the bearing sleeve 208 made of a sintered metal is completed by performing a correction process (sizing) on the inner peripheral surface and the outer peripheral surface of the sintered compact, and hence the step of molding dynamic pressure generating grooves in the inner peripheral surface as described above need not be provided. In this way, the shape of the bearing sleeve 208 can be simplified, and hence accuracy of the bearing can be secured. As a result, properties of the bearing sleeve 208, by extension, the fluid dynamic bearing device 201 as a whole can be secured.

Note that, when the dynamic pressure generating grooves Aa are formed by rolling in the outer peripheral surface of the shaft portion 221 (shaft preform) made of an ingot material, it is desired that the rolling process be performed on the outer peripheral surface of the shaft preform after the heat treatment. This is because the thickness increase caused by the rolling can be reduced in comparison with the case of performing the rolling process on a shaft preform that has not yet been subjected to the heat treatment, and hence the finishing process thereafter can be simplified, or the finishing process can be omitted.

Figure 28:
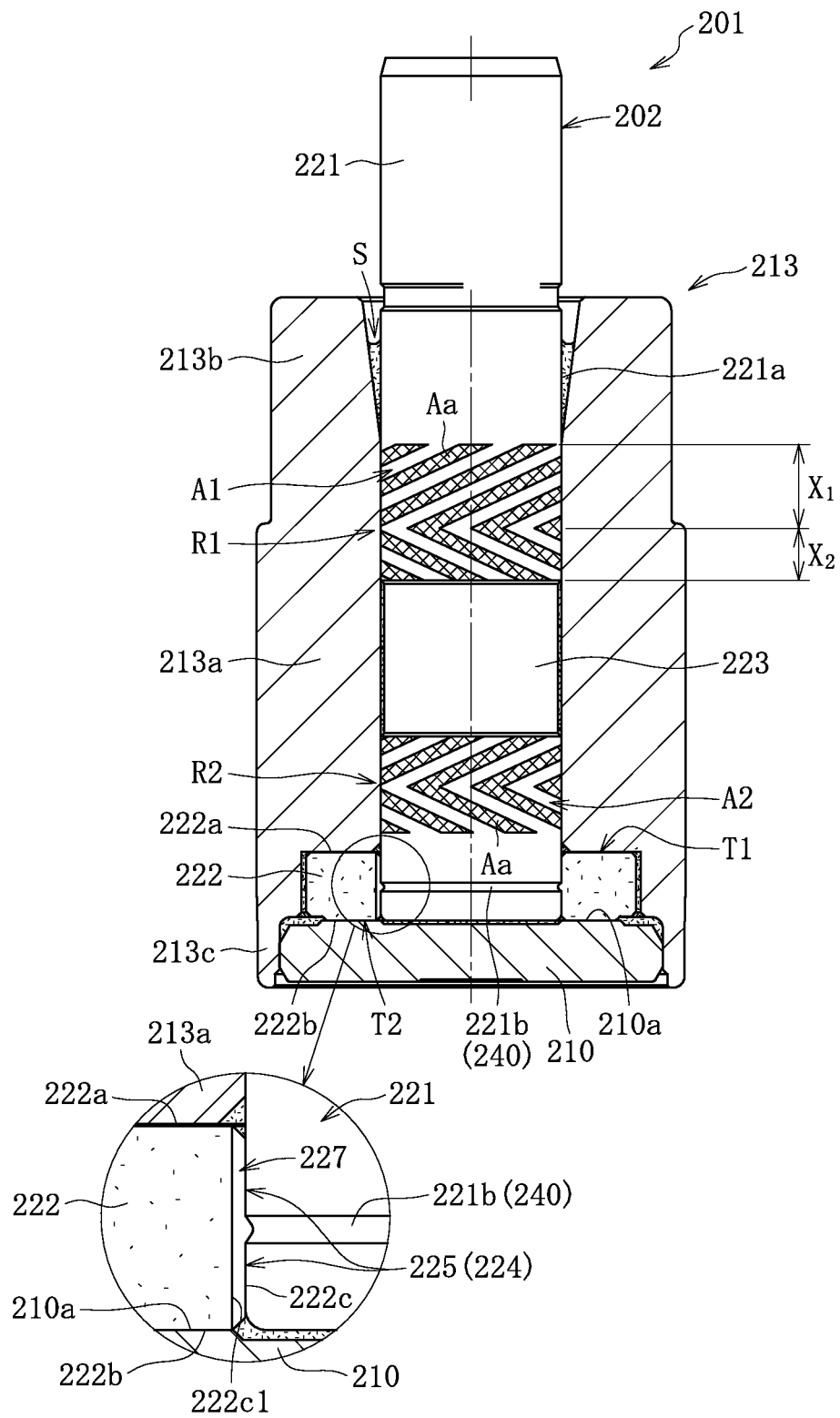
FIG. 28 is an axial sectional view of a fluid dynamic bearing device according to a fifth embodiment of the third invention of the present application.

FIG. 28 is an axial sectional view of a fluid dynamic bearing device 201 according to a fifth embodiment of this invention. In the embodiment illustrated in FIG. 28, a bearing member 213 corresponding to a structure obtained by integrating the housing 207 and the bearing sleeve 208 with each other, which are provided as separate members in the embodiment illustrated in FIG. 27, is arranged on the radially outer side with respect to the shaft member 202 (shaft portion 221). The bearing member 213 is obtained by forming an ingot material such as brass or stainless steel into a cylindrical shape, and integrally comprises: a bearing gap forming portion 213a for forming the radial bearing gaps of the radial bearing portions R1 and R2 between the bearing gap forming portion 213a and the opposing outer peripheral surface 221a of the shaft portion 221, and forming the thrust bearing gap of the first thrust bearing portion T1 between the bearing gap forming portion 213a and the opposing upper end surface 222a (thrust bearing surface) of the flange portion 222; a seal forming portion 213b for forming the sealing space S between the seal forming portion 213b and the opposing outer peripheral surface 221a of the shaft portion 221; and a lid member fixing portion 213c fixing the lid member 210 to an inner periphery thereof.

Further, in the radial dynamic pressure generating portion A1 provided to the outer peripheral surface 221a of the shaft portion 221, the upper and lower axial dimensions of the dynamic pressure generating grooves Aa are set to be different from each other (X1>X2). Thus, when the shaft member 202 is rotated, the lubricating oil interposed in gaps between an inner peripheral of the bearing gap forming portion 213a and the outer peripheral surface 221a of the shaft portion 221 is forced downward. In this case, pressure increases in a space on a closed side in the bearing, in particular, a space on the radially inner side of the thrust bearing gap of the second thrust bearing portion T2, and hence an excessive uplifting force is applied to the shaft member 202. As a result, a balance of supportability in the thrust directions between both the thrust bearing portions T1 and T2 may be difficult to maintain. As a countermeasure, in this embodiment, as illustrated on an enlarged scale in FIG. 28, a communication hole 227 is provided to open in both the end surfaces 222a and 222b of the flange portion 222. Here, the communication hole 227 is formed of an axial groove 222c1 formed in the inner peripheral surface 222c of the flange portion 222. The communication hole 227 thus provided enables the lubricating oil to be communicated between both the thrust bearing gaps through the communication hole 227. Thus, the pressure imbalance between both the thrust bearing gaps can be eliminated earlier. As a result, the balance of the supportability in the thrust directions between both the thrust bearing portions T1 and T2 can be maintained.

Still further, in this case, when the dynamic pressure generating grooves Ca forming the thrust dynamic pressure generating portion C are formed into a spiral pattern as illustrated in FIG. 18(b), the lubricating oil interposed in the thrust bearing gap of the second thrust bearing portion T2 is forced to the radially inner side, and hence the pressure increase in the space on the radially inner side of the thrust bearing gap is promoted. In order to avoid this, the dynamic pressure generating grooves Ca forming the thrust dynamic pressure generating portion C are formed into a herringbone pattern as illustrated in FIG. 29(b). Further, in this embodiment, as illustrated in FIG. 29(a), the dynamic pressure generating grooves Ba forming the thrust dynamic pressure generating portion B are also formed into a herringbone pattern, but the above-mentioned problem is not liable to occur in the thrust bearing gap of the first thrust bearing portion T1. Thus, the dynamic pressure generating grooves Ba may be formed into the spiral pattern illustrated in FIG. 18(a).

Further, in each of the cases described above, the radial dynamic pressure generating portions each formed of the plurality of dynamic pressure generating grooves Aa arrayed in a herringbone pattern or the like in the circumferential direction are provided to form the radial bearing portions R1 and R2 as a fluid dynamic bearing. However, the radial bearing portions R1 and R2 as a fluid dynamic bearing may be formed by forming a stepped surface provided with a plurality of axial grooves arranged in a circumferential direction or a multi-arc surface on any one of two surfaces facing each other across the radial bearing gaps. Alternatively, any one or both of the radial bearing portions R1 and R2 may be formed of what is called a cylindrical bearing.

Still further, in each of the cases described above, the thrust dynamic pressure generating portions B and C are respectively formed of the dynamic pressure generating grooves Ba and Ca in a spiral pattern or a herringbone pattern. However, any one or both of the thrust dynamic pressure generating portions B and C may be formed of a plurality of radial dynamic pressure generating grooves extending in the radial direction and arrayed in the circumferential direction.

Yet further, in each of the embodiments described above, the lubricating oil is used as a lubricating fluid filled in the internal space of the fluid dynamic bearing device 201. However, this invention is suitably applicable also to fluid dynamic bearing devices 201 that use, as the lubricating fluid, a lubricating grease, a magnetic fluid, and gases such as air.

Yet further, in each of the cases described above, this invention is applied to the fluid dynamic bearing devices 201 in which the shaft member 202 corresponds to a rotary side and the bearing sleeve 208 and the like correspond to a stationary side. However, this invention is suitably applicable also to a fluid dynamic bearing device 201 in which, reversely, the shaft member 202 corresponds to the stationary side and the bearing sleeve 208 and the like correspond to the rotary side.

Note that, the configurations of the fluid dynamic bearing devices according to the embodiments of the first invention of the present application, the second invention of the present application, and the third invention of the present application described above are appropriately combined with each other.

REFERENCE SIGNS LIST 1 fluid dynamic bearing device
2 shaft member
2a shaft portion
2b flange portion
3 disk hub
4 stator coil
5 rotor magnet
6 bracket
7 housing
7a side portion
7b bottom portion
8 bearing sleeve
9 sealing portion
A1, A2 radial bearing surface
D disk
G1, G2 dynamic pressure generating groove
G1', G2' hill portion
R1, R2 radial bearing portion
T1, T2 thrust bearing portion
S sealing space

The invention claimed is:

1. A fluid dynamic bearing device, comprising:
a shaft member comprising:
    a shaft portion; and
    a flange portion;
a bearing sleeve made of a sintered metal, the shaft portion is inserted into the bearing sleeve;
a radial bearing gap formed between an outer peripheral surface of the shaft portion and an inner peripheral surface of the bearing sleeve;
a radial dynamic pressure generating portion that is formed on the outer peripheral surface of the shaft portion and generates a dynamic pressure action in a lubricating fluid in the radial bearing gap;
a first thrust bearing gap formed between one end surface of the flange portion and one end surface of the bearing sleeve; and
a first thrust dynamic pressure generating portion that is formed on the one end surface of the flange portion and generates a dynamic pressure action in a lubricating fluid in the first thrust bearing gap,
    the shaft member being configured to be supported by the dynamic pressure action of the lubricating oil, which is generated in the radial bearing gap, and the dynamic pressure action of the lubricating oil, which is generated in the first thrust bearing gap, so as to freely allow relative rotation of the shaft member,
wherein the entire inner peripheral surface of the bearing sleeve is formed into a smooth cylindrical surface,
wherein the entire one end surface of the bearing sleeve is formed into a flat surface,
wherein a bulging portion is provided on an inner peripheral surface of the flange portion,
wherein a recessed portion is provided on the outer peripheral surface of the shaft portion, and
wherein the recessed portion receives the bulging portion, and the recessed portion and the bulging portion are engaged with each other in an axial direction.

2. A fluid dynamic bearing device according to claim 1,
wherein the radial dynamic pressure generating portion comprises a plurality of radial dynamic pressure generating portions formed in a plurality of regions spaced apart from each other in the axial direction on the outer peripheral surface of the shaft portion, and
wherein the shaft portion has a relief portion radially smaller than the plurality of radial dynamic pressure generating portions between the plurality of regions in the axial direction.

3. A fluid dynamic bearing device according to claim 1, wherein the flange portion is made of a sintered metal.

4. A fluid dynamic bearing device according to claim 3, wherein the sintered metal forming the flange portion contains a main component different from a main component of the sintered metal forming the bearing sleeve.

5. A fluid dynamic bearing device according to claim 4,
wherein the sintered metal forming the bearing sleeve comprises an iron-based sintered metal, and
wherein the sintered metal forming the flange portion comprises a copper-based sintered metal.

6. A fluid dynamic bearing device according to claim 1, further comprising:
a housing comprising:
    a side portion having a cylindrical shape, an inner peripheral surface of the side portion is fixed to the bearing sleeve; and
    a bottom portion closing an opening portion at one end of the side portion;
a second thrust bearing gap formed between an end surface of the bottom portion of the housing and another end surface of the flange portion; and
a second thrust dynamic pressure generating portion that is formed on the another end surface of the flange portion and generates a dynamic pressure action in a lubricating fluid in the second thrust bearing gap,
wherein at least a region on the end surface of the bottom portion of the housing, which faces the second thrust dynamic pressure generating portion, is formed of a flat surface.

7. A fluid dynamic bearing device according to claim 1, wherein the radial dynamic pressure generating portion is formed by performing a rolling process on an outer peripheral surface of a shaft preform after heat treatment.

8. A fluid dynamic bearing device according to claim 1, wherein a radially outermost surface of the radial dynamic pressure generating portion comprises a ground surface.

9. A fluid dynamic bearing device according to claim 1,
wherein the radial dynamic pressure generating portion comprises a plurality of recessed portions formed in the outer peripheral surface of the shaft member,
wherein the shaft member has a hardened surface layer formed by performing the heat treatment on the shaft preform, and
wherein the plurality of recessed portions are formed by performing the rolling process on the hardened surface layer.

10. A fluid dynamic bearing device according to claim 1,
wherein the flange portion is obtained by forming the sintered metal into an annular shape, and
wherein the first thrust dynamic pressure generating portion is molded in the one end surface of the flange portion by a pressing process.

11. A fluid dynamic bearing device according to claim 1,
wherein the recessed portion provided on the outer peripheral surface of the shaft portion is a circumferential groove.

12. A fluid dynamic bearing device, comprising:
a shaft member comprising:
  a shaft portion; and
  a flange portion;
a bearing sleeve, the shaft portion is inserted into the bearing sleeve;
a radial bearing gap formed between an outer peripheral surface of the shaft portion and an inner peripheral surface of the bearing sleeve; and
a first thrust bearing gap formed between one end surface of the flange portion and one end surface of the bearing sleeve;
  the shaft member configured to be supported by the dynamic pressure action of the lubricating oil, which is generated in the radial bearing gap, and the dynamic pressure action of the lubricating oil, which is generated in the first thrust bearing gap, so as to freely allow relative rotation of the shaft member,
wherein a bulging portion is provided on an inner peripheral surface of the flange portion,
wherein a recessed portion is provided on the outer peripheral surface of the shaft portion, and
wherein the recessed portion receives the bulging portion, and the recessed portion and the bulging portion are engaged with each other in an axial direction.

* * * * *